(12) United States Patent
Kobayashi

(10) Patent No.: US 12,216,028 B2
(45) Date of Patent: Feb. 4, 2025

(54) DERIVATION METHOD, DERIVATION DEVICE, DERIVATION SYSTEM, AND PROGRAM

(71) Applicant: SEIKO EPSON CORPORATION, Tokyo (JP)

(72) Inventor: Yoshihiro Kobayashi, Komagane (JP)

(73) Assignee: SEIKO EPSON CORPORATION (JP)

( * ) Notice: Subject to any disclaimer, the term of this patent is extended or adjusted under 35 U.S.C. 154(b) by 57 days.

(21) Appl. No.: 17/852,472

(22) Filed: Jun. 29, 2022

(65) Prior Publication Data

US 2023/0003610 A1 Jan. 5, 2023

(51) Int. Cl.
*G01M 5/00* (2006.01)
*B61L 23/04* (2006.01)
*E01D 18/00* (2006.01)

(52) U.S. Cl.
CPC .......... *G01M 5/0066* (2013.01); *B61L 23/04* (2013.01); *G01M 5/0008* (2013.01); *E01D 18/00* (2013.01)

(58) Field of Classification Search
None
See application file for complete search history.

(56) References Cited

U.S. PATENT DOCUMENTS

| 11,440,152 B2 * | 9/2022 | Uenishi | G05B 19/406 |
| 2011/0046929 A1 * | 2/2011 | Bryant | G01M 5/0066 |
| | | | 703/2 |
| 2020/0284930 A1 * | 9/2020 | Hida | G08B 21/10 |

FOREIGN PATENT DOCUMENTS

| JP | 6467304 B2 | 2/2019 |
| JP | 6543863 B2 | 7/2019 |

* cited by examiner

*Primary Examiner* — Raul J Rios Russo
*Assistant Examiner* — Carl F. R. Tchatchouang
(74) *Attorney, Agent, or Firm* — Harness, Dickey & Pierce, P.L.C.

(57) ABSTRACT

A derivation method includes: an acquisition step of acquiring time-series data including a physical quantity generated at a predetermined observation point in a structure as a response caused by a movement of a formation moving object formed with one or more moving objects on the structure; an environment information acquisition step of acquiring, as environment information, information on a structure length that is a length of the structure, a moving object length that is a length of the moving object, and an installation position of a contact portion of the moving object with the structure; a fundamental frequency derivation step of deriving a fundamental frequency of the time-series data based on the time-series data; a passing period derivation step of deriving a passing period during which the formation moving object passes through the structure based on the time-series data; and a number derivation step of deriving the number of the moving objects included in the formation moving object based on the environment information, the fundamental frequency, and the passing period.

11 Claims, 20 Drawing Sheets

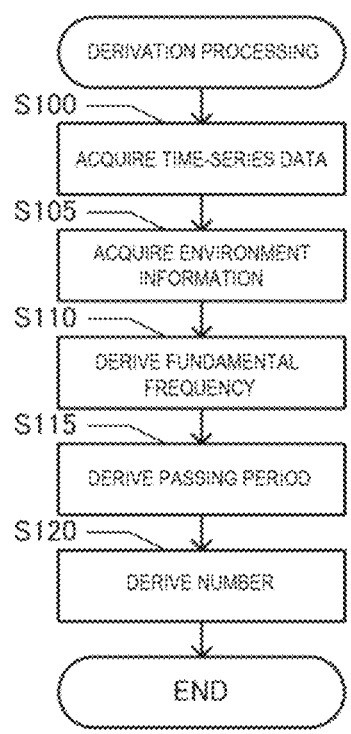

DERIVATION METHOD, DERIVATION DEVICE, DERIVATION SYSTEM, AND PROGRAM

The present application is based on, and claims priority from JP Application Serial Number 2021-108541, filed Jun. 30, 2021, the disclosure of which is hereby incorporated by reference herein in its entirety.

BACKGROUND

1. Technical Field

The present disclosure relates to a derivation method, a derivation device, a derivation system, and a program.

2. Related Art

In recent years, many social infrastructures have deteriorated over time, and there is a demand for a method for diagnosing a state of a structure constituting a social infrastructure such as a railway bridge.

JP-B-6543863 discloses a method for investigating structural performance of a railway bridge, which makes it possible to appropriately investigate and evaluate structural performance of a bridge by using observation data of acceleration response of the bridge during traveling of a train. In the method for investigating structural performance of a railway bridge according to JP-B-6543863, a theoretical analysis model of dynamic response of a railway bridge during traveling of a train is formulated using a train as a moving load train and a bridge as a simple beam, acceleration of the bridge during traveling of the railway train is measured, and unknown parameters of the theoretical analysis model are estimated from this acceleration data by a reverse analysis method.

JP-B-6467304 discloses a method for obtaining an impact coefficient (dynamic response component) of a bridge by using a vehicle vertical acceleration response of a traveling train particularly when the traveling train passes through the bridge.

There is a case where a formation moving object formed with one or more moving objects, such as a railway train, moves on a structure such as a bridge. In such a case, for the purpose of, for example, generating a motion model of the structure for diagnosis, there is a demand to grasp how many moving objects are formed in the formation moving object that moves on the structure. In JP-B-6543863, a calculation amount of an inverse analysis method for obtaining unknown parameters is enormous. In JP-B-6467304, it is not possible to determine how many moving objects are formed in the formation moving object that moves on the structure. As described above, in JP-B-6543863 and JP-B-6467304, it is not possible to determine, with a lower load, how many moving objects are formed in the formation moving object that moves on the structure.

SUMMARY

A derivation method includes: an acquisition step of acquiring time-series data including a physical quantity generated at a predetermined observation point in a structure as a response caused by a movement of a formation moving object formed with one or more moving objects on the structure; an environment information acquisition step of acquiring, as environment information, information on a structure length that is a length of the structure, a moving object length that is a length of the moving object, and an installation position of a contact portion of the moving object with the structure; a fundamental frequency derivation step of deriving a fundamental frequency of the time-series data based on the time-series data; a passing period derivation step of deriving a passing period during which the formation moving object passes through the structure based on the time-series data; and a number derivation step of deriving the number of the moving objects included in the formation moving object based on the environment information, the fundamental frequency, and the passing period.

A derivation device includes: an acquisition unit configured to acquire time-series data including a physical quantity generated at a predetermined observation point in a structure as a response caused by a movement of a formation moving object formed with one or more moving objects on the structure; an environment information acquisition unit configured to acquire, as environment information, information on a structure length that is a length of the structure, a moving object length that is a length of the moving object, and an installation position of a contact portion of the moving object with the structure; a fundamental frequency derivation unit configured to derive a fundamental frequency of the time-series data based on the time-series data; a passing period derivation unit configured to derive a passing period during which the formation moving object passes through the structure based on the time-series data; and a number derivation unit configured to derive the number of the moving objects included in the formation moving object based on the environment information, the fundamental frequency, and the passing period.

A derivation system includes a derivation device and a sensor. The derivation device includes: an acquisition unit configured to acquire time-series data including a physical quantity that is generated at a predetermined observation point in a structure as a response caused by a movement of a formation moving object formed with one or more moving objects on the structure and that is measured via the sensor; an environment information acquisition unit configured to acquire, as environment information, information on a structure length that is a length of the structure, a moving object length that is a length of the moving object, and an installation position of a contact portion of the moving object with the structure; a fundamental frequency derivation unit configured to derive a fundamental frequency of the time-series data based on the time-series data; a passing period derivation unit configured to derive a passing period during which the formation moving object passes through the structure based on the time-series data; and a number derivation unit configured to derive the number of the moving objects included in the formation moving object based on the environment information, the fundamental frequency, and the passing period.

A non-transitory computer-readable storage medium stores a program, the program causes a computer to execute: an acquisition step of acquiring time-series data including a physical quantity generated at a predetermined observation point in a structure as a response caused by a movement of a formation moving object formed with one or more moving objects on the structure; an environment information acquisition step of acquiring, as environment information, information on a structure length that is a length of the structure, a moving object length that is a length of the moving object, and an installation position of a contact portion of the moving object with the structure; a fundamental frequency derivation step of deriving a fundamental frequency of the time-series data based on the time-series data; a passing period derivation step of deriving a passing period during which the formation moving object passes through the structure based on the time-series data; and a number derivation step of deriving the number of the moving objects included in the formation moving object based on the environment information, the fundamental frequency, and the passing period.

BRIEF DESCRIPTION OF THE DRAWINGS

FIG. 20 is a flowchart showing the derivation processing.

DESCRIPTION OF EXEMPLARY EMBODIMENTS

Figure 1:
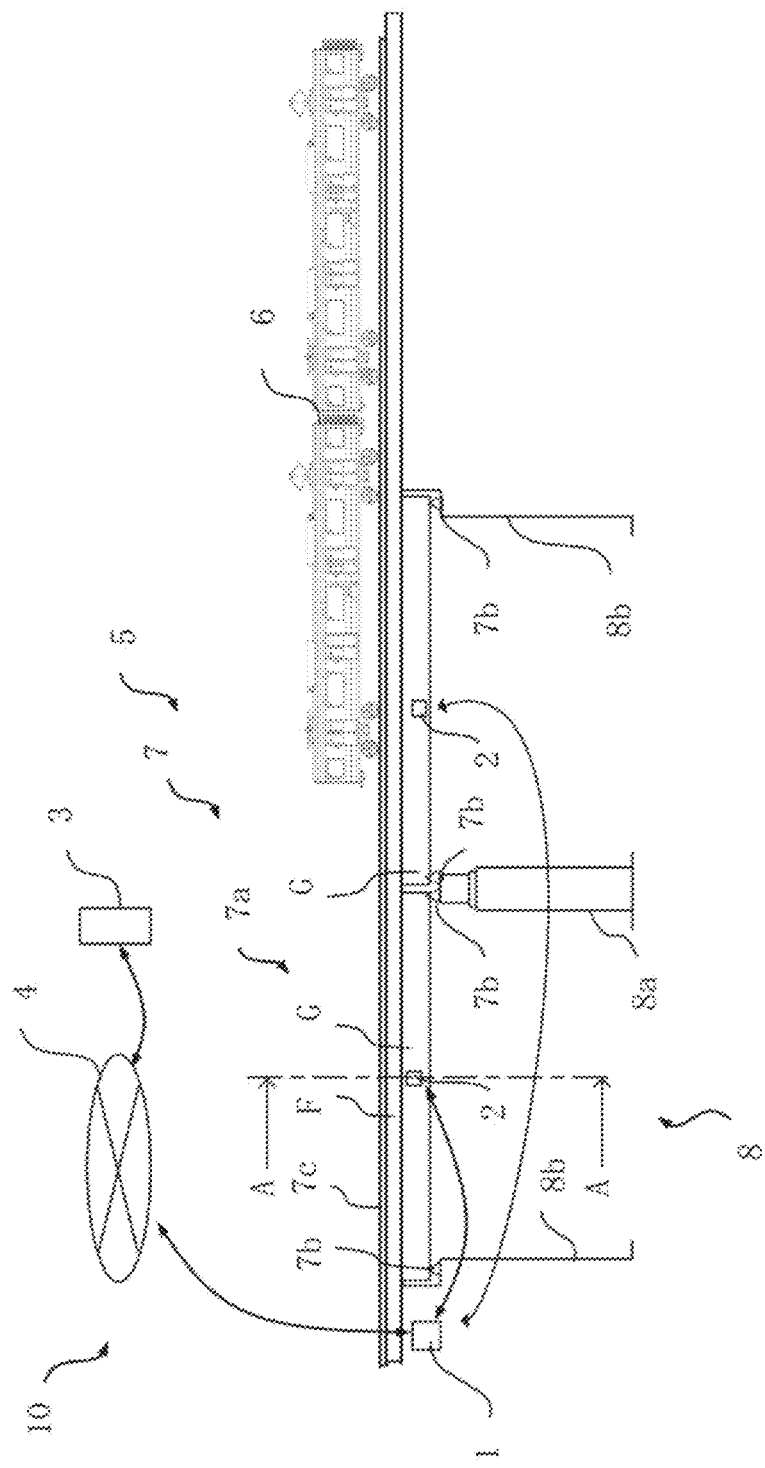
FIG. 1 is a block diagram showing a configuration of a derivation system.

Embodiments of the present disclosure will be described in the following order.
(1) Configuration of Derivation System
(1-1) Outline of Derivation System
(1-2) Deflection Model
(1-3) Verification Experiment
(1-4) Details of Elements
(2) Derivation Process
(3) Other Embodiments (1) Configuration of Derivation System (1-1) Outline of Derivation System FIG. 1 is a block diagram showing an example of a configuration of a derivation system 10 according to the present embodiment. The derivation system 10 is a system that derives the number of railway vehicles included in a railway train 6 based on time-series data including a physical quantity at a predetermined observation point on a bridge 5 on which the railway train 6 formed with one or more railway vehicles moves. The railway train 6 is an example of a formation moving object. Each of the railway vehicles included in the railway train 6 is an example of a moving object. The bridge 5 is an example of a structure on which the moving object moves. Each railway vehicle of the railway train 6 moves on the bridge 5 via wheels provided on an axle. The wheel is an example of a contact portion between the railway vehicle and the bridge. In the present embodiment, each of the railway vehicles formed in the railway train 6 is a railway vehicle having the same structure. As shown in FIG. 1, the derivation system 10 includes a measurement device 1, at least one sensor device 2 provided in a superstructure 7 of the bridge 5, and a server device 3.

The measurement device 1 calculates deflection, that is, a displacement of the superstructure 7 caused by traveling of the railway train 6 based on acceleration data output from each sensor device 2. The measurement device 1 is installed on, for example, a bridge abutment 8b. The measurement device 1 and the server device 3 can communicate with each other via, for example, a wireless network of a mobile phone and a communication network 4 such as the Internet. The measurement device 1 transmits information on the displacement of the superstructure 7 caused by the traveling of the railway train 6 to the server device 3. The server device 3 derives the number of railway vehicles formed in the railway train 6 based on the transmitted displacement data.

In the present embodiment, the bridge 5 is a railroad bridge, and is, for example, a steel bridge, a girder bridge, or an RC bridge. The RC is an abbreviation for reinforced-concrete. In the present embodiment, the bridge 5 is a structure to which Bridge Weigh In Motion (BWIM) is applicable. The BWIM is a technology in which a bridge is regarded as a "scale", deformation of the bridge is measured, and thereby a weight and the number of axles of a moving object passing through the bridge is measured. The bridge, which enables analysis of the weight of the moving object traveling on the bridge, based on a response such as deformation or strain of the bridge, is considered to be a structure to which BWIM is applicable. Therefore, the BWIM system, which applies a physical process between an action on the bridge and the response, enables the measurement of the weight of the moving object that travels on the bridge. The weight of the moving object is measured by measuring a correlation coefficient between the displacement and a load in advance, and using the correlation coefficient to derive the load of the moving object passing through from the measurement result of the displacement of the bridge when the moving object passes through.

Figure 2:
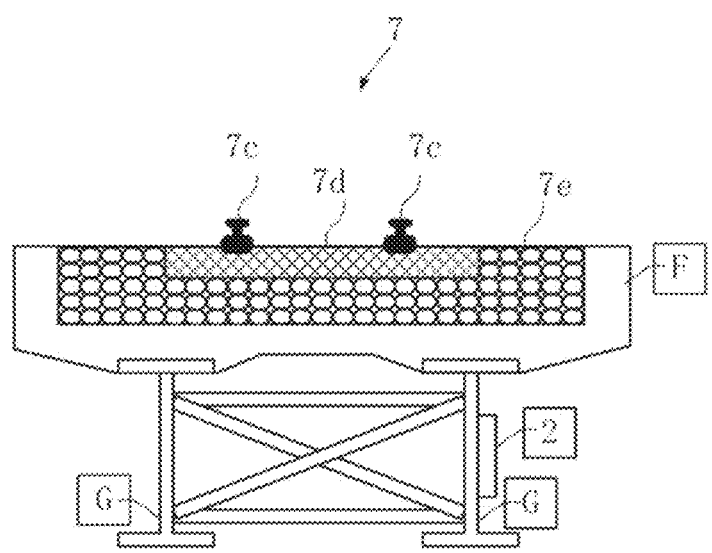
FIG. 2 is a diagram showing a cross section of a bridge.

The bridge 5 includes the superstructure 7 that is a portion where the moving object moves, and a substructure 8 that supports the superstructure 7. FIG. 2 is a cross-sectional view of the superstructure 7 taken along a line A-A of FIG. 1. As shown in FIGS. 1 and 2, the superstructure 7 includes a bridge floor 7a, a support 7b, rails 7c, ties 7d, and a ballast 7e, and the bridge floor 7a includes a floor plate F, a main girder G, a cross girder which is not shown. As shown in FIG. 1, the substructure 8 includes bridge piers 8a and the bridge abutments 8b. The superstructure 7 is a structure across the bridge abutment 8b and the bridge pier 8a adjacent to each other, two adjacent bridge abutments 8b, or two adjacent bridge piers 8a. Hereinafter, the bridge abutment 8b and the bridge pier 8a are collectively referred to as a support portion. In the present embodiment, a set of support portions and a portion of the bridge girder of the superstructure 7 across the set of support portions are collectively referred to as one bridge girder. That is, a simple beam-like structure in which both ends are supported by two support portions is defined as one bridge girder. Therefore, the bridge 5 shown in FIG. 1 includes two bridge girders. Hereinafter, each bridge girder included in the bridge 5 is referred to as a unit bridge girder.

The measurement device 1 and the sensor device 2 are coupled to each other, for example, in a wired or wireless manner, and communicate with one another via a communication network such as a controller area network (CAN).

The sensor device 2 is used to measure a predetermined physical quantity used to derive a displacement (deflection) at an observation point set on the superstructure 7. In the present embodiment, the predetermined physical quantity is an acceleration. In the present embodiment, the sensor device 2 is installed at the observation point. The sensor device 2 includes an acceleration sensor such as a quartz acceleration sensor or a micro electro mechanical systems (MEMS) acceleration sensor. The sensor device 2 outputs acceleration data for deriving the displacement of the superstructure 7 caused by a movement of the railway train 6 which is a moving object at the observation point.

In the present embodiment, the sensor device 2 is installed at a central portion of the superstructure 7 in a longitudinal direction, specifically, at a central portion of the main girder G in the longitudinal direction. The sensor device 2 is not limited to being installed at the central portion of the superstructure 7 as long as the sensor device 2 can detect an acceleration for calculating the displacement of the superstructure 7. When the sensor device 2 is provided on the floor plate F of the superstructure 7, the sensor device 2 may be damaged due to traveling of the railway train 6, and the measurement accuracy may be affected by local deformation of the bridge floor 7a, so that in the example of FIGS. 1 and 2, the sensor device 2 is provided at the main girder G of the superstructure 7.

The floor plate F, the main girders G, and the like of the superstructure 7 are deflected in a vertical direction due to a load of the railway train 6 traveling on the superstructure 7. Each sensor device 2 measures an acceleration of the deflection of the floor plate F or the main girder G caused by the load of the railway train 6 traveling on the superstructure 7.

(1-2) Deflection Model

Here, a model of deflection of a bridge when a railway train moves on one bridge will be described. Here, the model is information such as an equation indicating a correspondence relationship between predetermined information and a derivation result.

In the following, the number of railway vehicles (the number of railway vehicles) formed in the railway train moving on the bridge is defined as N. An entry time point, which is a time point at which the railway train enters the bridge, is defined as $t_i$. Here, the entry of the railway train into the bridge means that the wheels of a first axle of a railway vehicle $C_1$ (a first railway vehicle from the head of the railway train) have entered the bridge. In the following, an exit time point, which is a time point at which the railway train exits from the bridge, is defined as to. Here, the exit of the railway train from the bridge means that the wheels of a rearmost axle of a railway vehicle CN (the rearmost railway vehicle of the railway train) have exited from the bridge. In addition, in the following, a period during which the railway train passes through the bridge (a period from the time point $t_i$ to the time point $t_o$) is defined as $t_s$. Hereinafter, N, $t_i$, $t_o$, and $t_s$ are collectively referred to as observation information.

Figure 3:
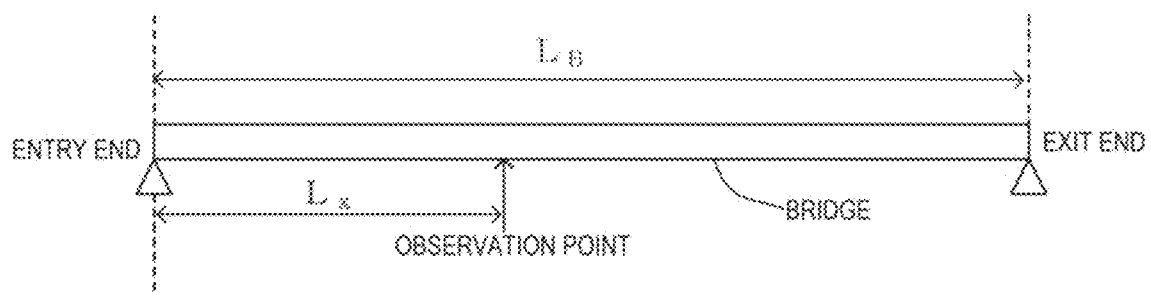
FIG. 3 is a diagram showing dimensions of a unit bridge girder.

In the following description, a bridge length, which is a length of the bridge in the traveling direction of the railway train, is defined as LB. The bridge length is an example of a structure length. A distance from an end in a direction in which the railway train enters among ends of the bridge in the longitudinal direction to the observation point is defined as $L_x$. FIG. 3 shows the lengths $L_B$ and $L_x$. In the following description, the end in a direction in which the railway train enters among the ends of the bridge in the longitudinal direction is referred to as an entry end. In addition, in the following, an end in a direction in which the railway train exits among the ends of the bridge in the longitudinal direction is referred to as an exit end. A vehicle length, which is a length in the traveling direction of the mth railway vehicle from the head of the railway train, is defined as $L_c(m)$. The vehicle length is an example of a moving object length that is a length of the moving object in the traveling direction. In the following, the lengths $L_c(1)$ to $L_c(N)$ are collectively referred to as a length $L_c$. The mth railway vehicle from the head of the railway train is defined as $C_m$. The number of axles in the railway vehicle Cm is defined as $a_r(m)$. Hereinafter, $a_r(1)$ to $a_r(N)$ are collectively referred to as $a_r$. Hereinafter, the $a_r(m)$ axles in the railway vehicle $C_m$ are defined as a first axle, a second axle, a third axle, . . . , an $a_r(m)$th axle in order from the head of the railway vehicle $C_m$.

A distance from a front end of the railway vehicle $C_m$ in a traveling direction to the first axle is defined as $L_a(a_w(m, 1))$. Here, $a_w(\alpha, \beta)$ indicates a βth axle from a head axle of the αth railway vehicle in the railway train. The number of axles in the railway vehicle Cm is defined as $a_r(m)$. A distance between a (n−1)th axle and a nth axle in the railway vehicle $C_m$ is defined as $L_a(a_w(m, n))$, n being an integer of 2 or more. That is, for two or more β, $L_a(a_w(\alpha, \beta))$ indicates a distance between the βth axle and the (β−1)th axle in a railway vehicle $C_\alpha$. In addition, $L_a(a_w(\alpha, 1))$ indicates a distance between a first axle of the railway vehicle $C_\alpha$ and the front end of the railway vehicle $C_\alpha$ in the traveling direction. Hereinafter, $L_a(a_w(1, 1))$ to $L_a(a_w(N, a_r(N)))$ are collectively referred to as $L_a$. Each $L_a$ indicates a position of the corresponding axle in the corresponding railway vehicle. For example, $L_a(a_w(m, 1))$ indicates that the first axle is present behind the front end of the railway vehicle $C_m$ by a distance of $L_a(a_w(m, 1))$. $L_a(a_w(m, 2))$ indicates that the second axle is present behind the first axle of the railway vehicle $C_m$ by a distance of $L_a(a_w(m, 2))$.

Figure 4:
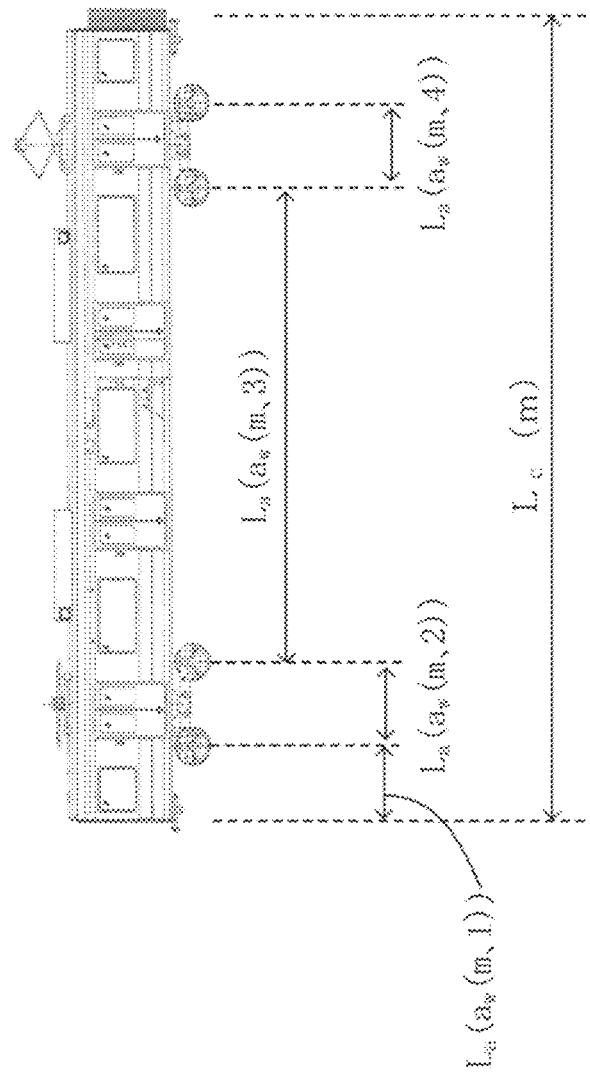
FIG. 4 is a diagram showing dimensions of a railway vehicle.

Here, a railway vehicle having a similar four-axle configuration is formed in the railway train. That is, $a_r(m)$ is 4, m being 1, 2, . . . , N. FIG. 4 shows the lengths $L_c(m)$, $L_a(a_w(m, 1))$, $L_a(a_w(m, 2))$ $L_a(a_w(m, 3))$, and $L_a(a_w(m, 4))$ in the railway vehicle $C_m$.

Hereinafter, $L_B$, $L_x$, $L_c$, $a_r$, and $L_a$ are collectively referred to as environment information.

As shown in the following Equation (1), $t_s$ is obtained as a difference between to and $t_i$.

$$t_s = t_o - t_i \tag{1}$$

The total number $T_{a_r}$ of wheels of the railway train is obtained by the following Equation (2).

$$T_{a_r} = \sum_{m=1}^{N} a_r(m) \tag{2}$$

A distance from the first axle of the railway vehicle $C_1$ at the head of the railway vehicle to the nth axle of the mth railway vehicle $C_m$ of the railway vehicle is represented as $D_{wa}(a_w(m, n))$. $D_{wa}(a_w(m, n))$ is obtained from the following Equation (3).

$$D_{wa}(a_w(m, n)) = \sum_{y=1}^{m} L_c(y) + \sum_{x=1}^{n} L_a(a_w(m, x)) - L_c(m) - L_a(a_w(1, 1)) \quad (3)$$

The distance from the first axle of the railway vehicle $C_1$ at the head of the railway train to the last axle $a_r(N)$ of the rearmost railway vehicle $C_N$ is $D_{wa}(a_w(N, a_r(N)))$. By using $D_{wa}(a_w(N, a_r(N)))$, an average velocity $v_a$ of the railway train passing through the bridge is represented by the following Equation (4).

$$v_a = \frac{L_B}{t_s} + \frac{D_{wa}(a_w(N, a_r(N)))}{t_s} \quad (4)$$

From Equation (3) and Equation (4), the following Equation (5) is established.

$$v_a = \frac{L_B}{t_S} + \frac{1}{t_S}\left[\sum_{m=1}^{N} L_c(m) + \sum_{n=1}^{a_r(N)} L_a(a_w(N, n)) - L_c(N) - L_a(a_w(1, 1))\right] \quad (5)$$

Next, deflection generated in the bridge when a load is applied to the bridge will be described.

Figure 5:
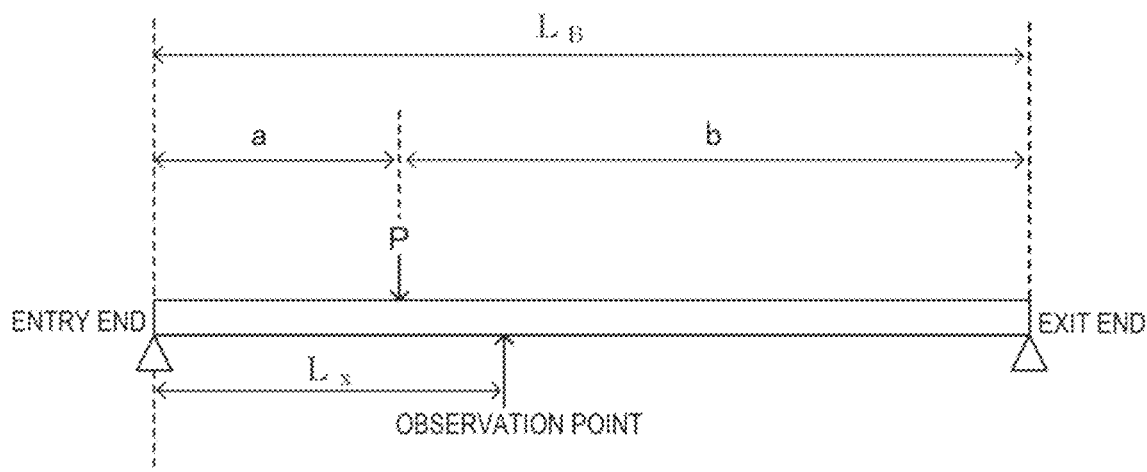
FIG. 5 is a diagram showing an outline of the unit bridge girder.

FIG. 5 is a schematic view of the bridge. FIG. 5 shows a situation in which a load P is applied to the bridge. Here, a distance between a position of the bridge to which the load P is applied and the entry end is represented by a. A distance between the position of the bridge to which the load P is applied and the exit end is represented by b. In this case, the bending moment at the position of the bridge to which the load P is applied is represented by the following Equation (6).

$$M = \frac{abP}{L_B} \quad (6)$$

Figure 6:
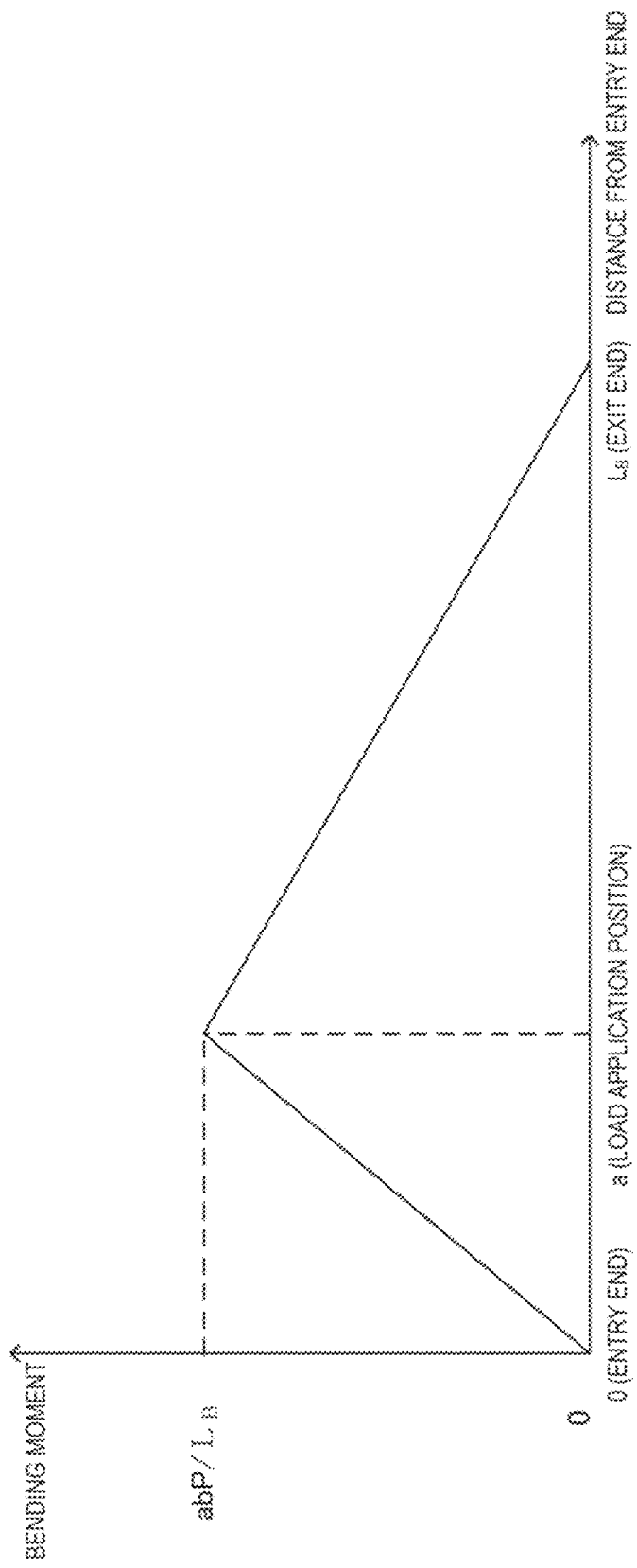
FIG. 6 is a diagram showing a bending moment at the unit bridge girder.

FIG. 6 shows the bending moment at each position of the bridge due to the load P. As shown in FIG. 6, the bending moment generated in the bridge due to the load P is 0 at the entry end, increases proportionally as the position approaches the position to which the load P is applied from the entry end, and becomes a value represented by Equation (6) at the position to which the load P is applied. The bending moment generated in the bridge due to the load P decreases proportionally as the position approaches the exit end from the position to which the load P is applied, and becomes 0 at the exit end. Therefore, the bending moment at an optional position X in the bridge is represented by the following Equation (7).

$$M = \frac{bP}{L_B}x - H_a P(x - a) \quad (7)$$

In Equation (7), x represents the distance from the entry end to the position X in the traveling direction of the railway train. Ha in Equation (7) is a value represented by the following Equation (8).

$$H_a = \begin{cases} x \le a: & 0 \\ x > a: & 1 \end{cases} \quad (8)$$

Between the bending moment and a deflection w of the bridge at the optional position X, a relationship represented by the following Equation (9) is established.

$$-M = EI\frac{d\theta}{dx} = EI\frac{d^2 w}{dx^2} \quad (9)$$

θ in Equation (9) is an angle formed by a horizontal line and the deflected bridge at the position X. From Equation (7) and Equation (9), the following Equation (10) is established.

$$\frac{d^2 w}{dx^2} = -\frac{1}{EI}\left(\frac{bP}{L_B}x - H_a P(x - a)\right) \quad (10)$$

By integrating both sides of Equation (10) twice with x, the following Equation (11) representing the deflection w at the position X is obtained.

$$w = \frac{P}{6EIL_B}\{-bx^3 + H_a L_B(x - a)^3 + g1x + g2\} \quad (11)$$

In Equation (11), g1 and g2 are constant terms. Here, since the bridge is supported at the entry end and the exit end, no deflection is generated at the positions of the entry end and the exit end. That is, in Equation (11), when x=0 and x=$L_B$, both sides are 0. Therefore, g1 and g2 are represented by the following Equation (12) and Equation (13).

$$g1 = ab(a + 2b) \quad (12)$$

$$g2 = 0 \quad (13)$$

From Equation (11), Equation (12), and Equation (13), the following Equation (14) representing the deflection w at the position X is obtained.

$$w = \frac{P}{6EIL_B}\{-bx^3 + H_a L_B(x - a)^3 + ab(a + 2b)x\} \quad (14)$$

When the load P is applied to a center of the bridge in the longitudinal direction, the maximum deflection among the deflection generated in the bridge due to the application of the load P is generated at the center of the bridge in the longitudinal direction. When this maximum deflection is $w_{0.5l}$, an equation representing $w_{0.5l}$ is obtained. When the load P is applied to the center of the bridge in the longitudinal direction, a=b=0.5$L_B$. Since the position X of a target for which the deflection is to be obtained is the center of the bridge in the longitudinal direction, x=0.5$L_B$. In this case, since x≤a, $H_a$=0 is obtained from Equation (8). By substituting x=0.5$L_B$, a=b=0.5$L_B$, and $H_a$=0 into Equation (14), the following Equation (15) representing the deflection $w_{0.5l}$ is obtained.

$$w_{0.5l} = \frac{P}{48EI}L_B^3 \quad (15)$$

The deflection at an optional position in the bridge represented by Equation (14) is normalized using $w_{0.5l}$.

When the position of the load P exists on the entry end side with respect to the position X, that is, when x>a, $H_a=1$ is obtained from Equation (8), and Equation (14) is represented as Equation (16) below.

$$w = \frac{P}{6EIL_B}\{-bx^3 + L_B(x-a)^3 + ab(a+2b)x\} \quad (16)$$

$a=L_B r$. Here, r is a real number from 0 to 1. Since $b=L_B-a$, b is represented as $b=L_B(1-r)$. When $a=L_B r$ and $b=L_B(1-r)$ are substituted into Equation (16) and the deflection is normalized by dividing by $w_{0.5l}$, the following Equation (17) representing normalized deflection $w_{std}$ at the position X when x>a is obtained.

$$w_{std} = \frac{8}{L_B}\left\{xr^3 + \left(\frac{x^3}{L_B^2} + 2x\right)r\right\} - \frac{8}{L_B}\left\{L_B r^3 + \frac{3x^2}{L_B}r\right\} \quad (17)$$

Similarly, when the position of the load P exists on the exit end side with respect to the position X, that is, when x≤a, $H_a=0$ is obtained from Equation (8), and Equation (14) is represented as the following Equation (18).

$$w = \frac{P}{6EIL_B}\{-bx^3 + ab(a+2b)x\} \quad (18)$$

$a=L_B r$. Here, r is a real number from 0 to 1. Since $b=L_B-a$, b is represented as $b=L_B(1-r)$. When $a=L_B r$ and $b=L_B(1-r)$ are substituted into Equation (18) and the deflection is normalized by dividing by $w_{0.5l}$, the following Equation (19) representing the normalized deflection $w_{std}$ at the position X when x≤a is obtained.

$$w_{std} = \frac{8}{L_B}\left\{xr^3 + \left(\frac{x^3}{L_B^2} + 2x\right)r\right\} - \frac{8}{L_B}\left\{3xr^2 + \frac{x^3}{L_B^2}\right\} \quad (19)$$

By substituting $L_x$ for x in Equation (17) and Equation (19), the normalized deflection $w_{std}$ at the deflection observation point is represented as the following Equation (20) as a function of r.

$$w_{std}(r) = \frac{8}{L_B}\left\{L_x r^3 + \left(\frac{L_x^3}{L_B^2} + 2L_x\right)r - R(r)\right\} \quad (20)$$

The function R(r) in Equation (20) is a function represented by the following Equation (21).

$$R(r) = \begin{cases} L_x > L_B r: & L_B r^3 + \frac{3L_x^2}{L_B}r \\ L_x \leq L_B r: & 3L_x r^2 + \frac{L_x^3}{L_B^2} \end{cases} \quad (21)$$

Here, using Equation (20) and Equation (21), a function indicating a temporal change in deflection generated at an observation point due to a load applied to the bridge via a wheel of any one axle $a_w(m, n)$ is obtained. First, a period required for the wheel of one axle of the railway train to reach the observation point from the entry end is defined as $t_{xn}$. $t_{xn}$ is obtained from $L_x$ and $v_a$ by the following Equation (22).

$$t_{xn} = \frac{L_x}{v_a} \quad (22)$$

A period during which one wheel of the railway train crosses the bridge, that is, a period from the entry end to the exit end is defined by $t_{ln}$. $t_{ln}$ is obtained from $L_B$ and $v_a$ by the following Equation (23).

$$t_{ln} = \frac{L_B}{v_a} \quad (23)$$

A time point at which the wheel of the nth axle $a_w(m, n)$ of the mth railway vehicle of the railway train reaches the entry end is defined as $t_o(m, n)$. $t_o(m, n)$ is obtained from $t_i$, $v_a$, and $D_{wa}(a_w(m, n))$ by the following Equation (24).

$$t_0(m, n) = t_i + \frac{D_{wa}(a_w(m, n))}{v_a} \quad (24)$$

From Equation (22), $L_x$ is represented as the following Equation (25).

$$L_x = v_a t_{xn} \quad (25)$$

From Equation (23), $L_B$ is represented as the following Equation (26).

$$L_B = v_a t_{ln} \quad (26)$$

The position of the axle $a_w(m, n)$ is a load position. Therefore, the position of the axle $a_w(m, n)$ is a position at a distance of $a=L_B r$ in the direction from the entry end to the exit end. When a variable indicating the time point is t, a distance from the entry end of $a_w(m, n)$ at the time point t is equal to a distance traveled by the railway vehicle from the time point $t_o(m, n)$ to the time point t. Therefore, the following Equation (27) is established.

$$L_B r = v_a(t - t_0(m,n)) \quad (27)$$

From Equation (27), r is represented as in the following Equation (28).

$$r = \frac{v_a(t - t_0(m, n))}{L_B} = \frac{v_a(t - t_0(m, n))}{v_a t_{ln}} = \frac{(t - t_0(m, n))}{t_{ln}} \quad (28)$$

By replacing $L_x$, $L_B$, and r in Equation (20) and Equation (21) using Equation (25), Equation (26), and Equation (28), a function $w_{std}(a_w(m, n), t)$ in the following Equation (29) is obtained as a model indicating a temporal change in deflection generated at the observation point due to the load applied to the bridge via the wheel of the axle $a_w(m, n)$. A function R(t) in Equation (29) is a function represented by the following Equation (30).

$$w_{std}(a_w(m, n), t) = \quad (29)$$

-continued $$R(t) = \begin{cases} t < t_0(m, n): 0 \\ t_0(m, n) \leq t \leq t_0(m, n) + t_{ln}: \\ \frac{8}{t_{ln}}\left\{t_{xn}\left(\frac{t - t_0(m, n)}{t_{ln}}\right)^3 + \left(\frac{t_{xn}^3}{t_{ln}^2} + 2t_{xn}\right)\left(\frac{t - t_0(m, n)}{t_{ln}}\right) - R(t)\right\} \\ t_0(m, n) + t_{ln} < t: 0 \end{cases}$$

$$R(t) = \begin{cases} t < t_0(m, n): 0 \\ t_0(m, n) \leq t \leq t_0(m, n) + t_{ln} \cap t_{xn} > t - t_0(m, n): \\ t_{ln}\left(\frac{t - t_0(m, n)}{t_{ln}}\right)^3 + \frac{3t_{xn}^2}{t_{ln}}\left(\frac{t - t_0(m, n)}{t_{ln}}\right) \\ t_0(m, n) \leq t \leq t_0(m, n) + t_{ln} \cap t_{xn} \leq t - t_0(m, n): \\ 3t_{xn}\left(\frac{t - t_0(m, n)}{t_{ln}}\right)^2 + \frac{t_{xn}^3}{t_{ln}^2} \\ t_0(m, n) + t_{ln} < t: 0 \end{cases} \quad (30)$$

When the observation information and the environment information ($t_i$, $t_o$, N, $L_B$, $L_x$, $L_c(1)$ to $L_c(N)$, $a_r(1)$ to $a_r(N)$, and $L_a(a_w(1, 1))$ to $L_a(a_w(N, a_r(N))))$ are known, $w_{std}(a_w(m, n), t)$ is obtained using the information. For example, $t_s$ is obtained from $t_i$ and $t_o$ using Equation (1). From $t_s$, N, $a_r$, $L_a$, and $L_c$, $v_a$ is obtained using Equation (5). From $v_a$, $L_B$, and $L_x$, $t_{xn}$ and tin are obtained using Equation (22) and Equation (23). From $L_a$, $L_c$, and $t_i$, $t_o(m, n)$ is obtained using Equation (3) and Equation (24). Then, by substituting the obtained $t_{xn}$, $t_{ln}$, and $t_o(m, n)$ into the Equation (29) and Equation (30), the function $w_{std}(a_w(m, n), t)$ of t is obtained.

Figure 7:
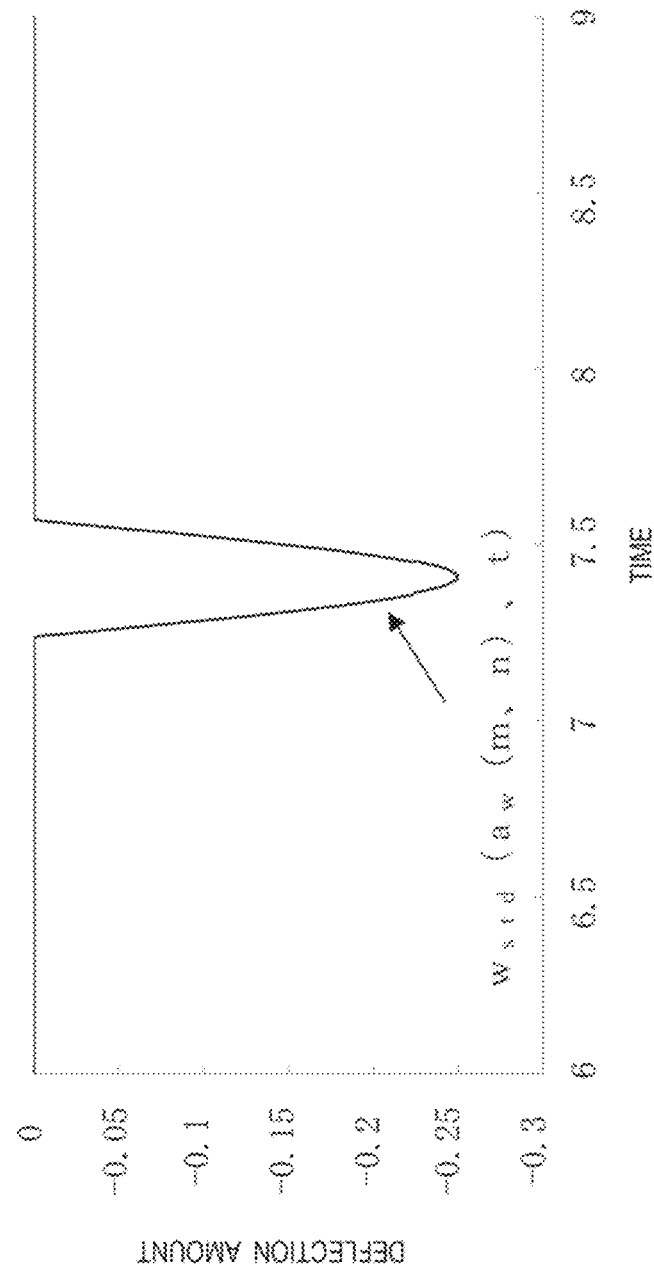
FIG. 7 is a diagram showing an outline of deflection of the unit bridge girder caused by a wheel.

An example of a change in the deflection amount at the observation point indicated by $w_{std}(a_w(m, n), t)$ is shown in FIG. 7. In a graph of FIG. 7, a horizontal axis represents time, and a vertical axis represents the deflection amount. In accordance with the movement of one railway vehicle $C_m$, a set of wheels for each of the $a_r(m)$ axles moves on the bridge. Therefore, a function $C_{std}(m, t)$ serving as a model indicating a temporal change in the deflection amount generated at the observation point due to the movement of one railway vehicle $C_m$ is obtained as the sum of $w_{std}(a_w(m, n), t)$ for the respective axles as in the following Equation (31).

$$C_{std}(m, t) = \sum_{n=1}^{a_r(m)} w_{std}(a_w(m, n), t) \quad (31)$$

Figure 8:
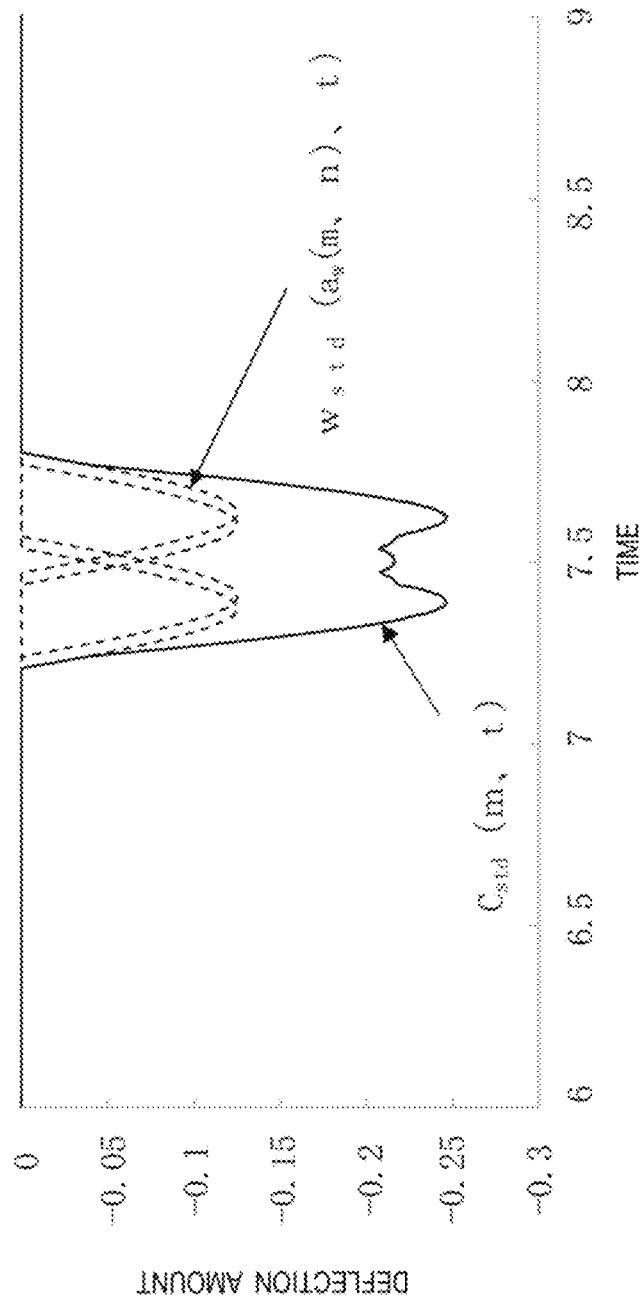
FIG. 8 is a diagram showing an outline of deflection of the unit bridge girder caused by a railway vehicle.

FIG. 8 shows how the deflection amount changes at the observation point indicated by the function $C_{std}(m, t)$ when $a_r(m)$ is 4, that is, when the railway vehicle $C_m$ has a four-axle configuration. In a graph of FIG. 8, a horizontal axis represents time, and a vertical axis represents the deflection amount. A solid line in the graph of FIG. 8 indicates $C_{std}(m, t)$, and each dotted line in the graph indicates $w_{std}(a_w(m, n), t)$ for each axle.

In accordance with the movement of the railway train, the N railway vehicles move on the bridge. Therefore, a function $T_{std}(t)$ serving as a model indicating a temporal change in the deflection amount generated at the observation point due to movement of one railway train is obtained as the sum of $C_{std}(m, t)$ for the respective railway vehicles as in the following Equation (32).

$$T_{std}(t) = \sum_{m=1}^{N} C_{std}(m, t) \quad (32)$$

Figure 9:
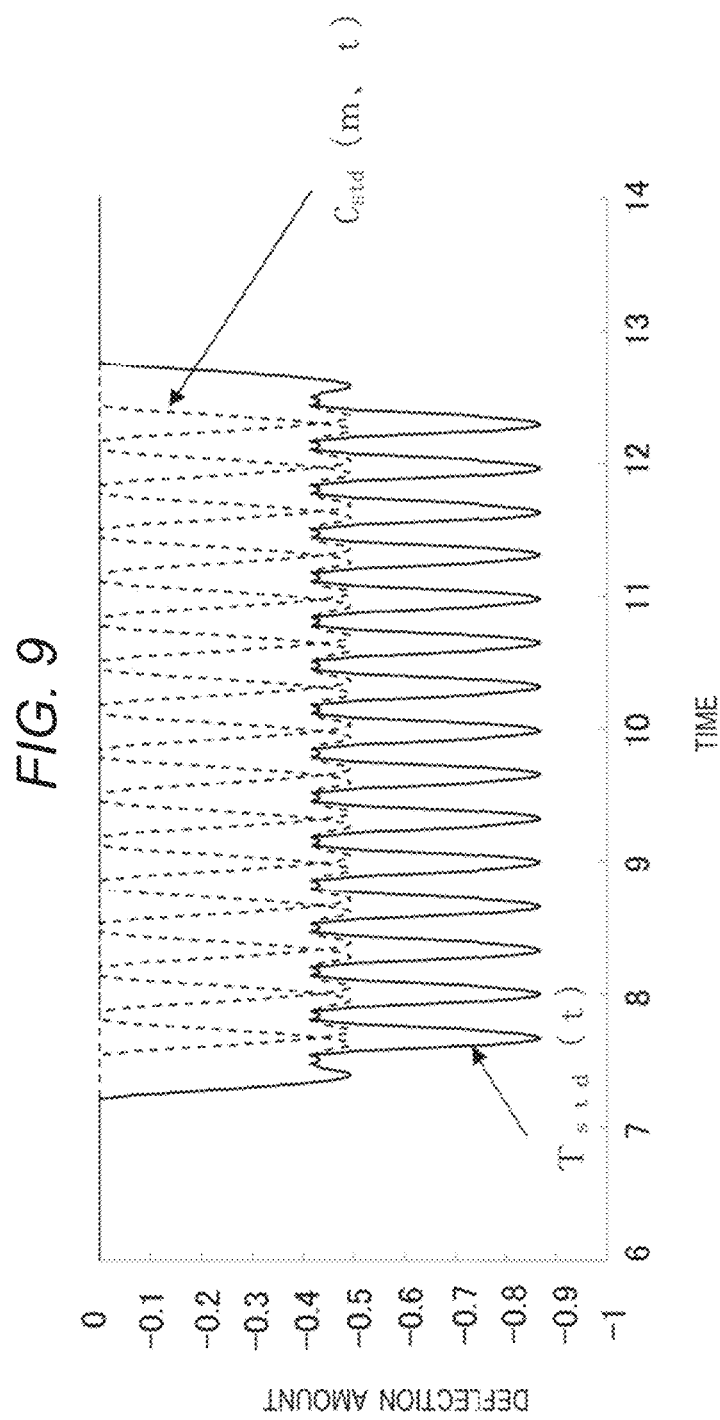
FIG. 9 is a diagram showing an outline of deflection of the unit bridge girder caused by a railway train.

FIG. 9 shows how the deflection amount changes at the observation point indicated by the function $T_{std}(t)$ when N is 16, that is, when 16 railway vehicles are formed in the railway train. In a graph of FIG. 9, a horizontal axis represents time, and a vertical axis represents the deflection amount. A solid line in the graph of FIG. 9 indicates $T_{std}(t)$, and each dotted line in the graph indicates $C_{std}(m, t)$ for each railway vehicle. As shown in the graph of FIG. 9, the waveform is obtained by adding together the deflection of each passing railway vehicle, and it can be seen that vibration occurs in a cycle in which continuous vehicles pass through the bridge.

The deflection model of the bridge is described as above.

(1-3) Verification Experiment

Deflection amounts $C_{std}(1, t)$ to $C_{std}(N, t)$ and $T_{std}(t)$ generated when a railway train formed with the same railway vehicles passes through the bridge are considered under conditions in which the observation information and the environment information have the following values. That is, N=4, $t_i$=7.21 [sec], $t_o$=8.777 [sec], $t_s$=1.567 [sec], $L_B$=25 [in] $L_x$=12.5 [In] $L_c$=25 [In] $a_r$=4, $L_a(a_w (m, 1))$=2.5 [m] for each of m=1 to N, $L_a(a_w(m, 2))$=2.5 [m] for each of m=1 to N, $L_a(a_w(m, 3))$=15 [m] for each of m=1 to N, and $L_a(a_w(m, 4))$=2.5 [m] for each of m=1 to N.

Figure 10:
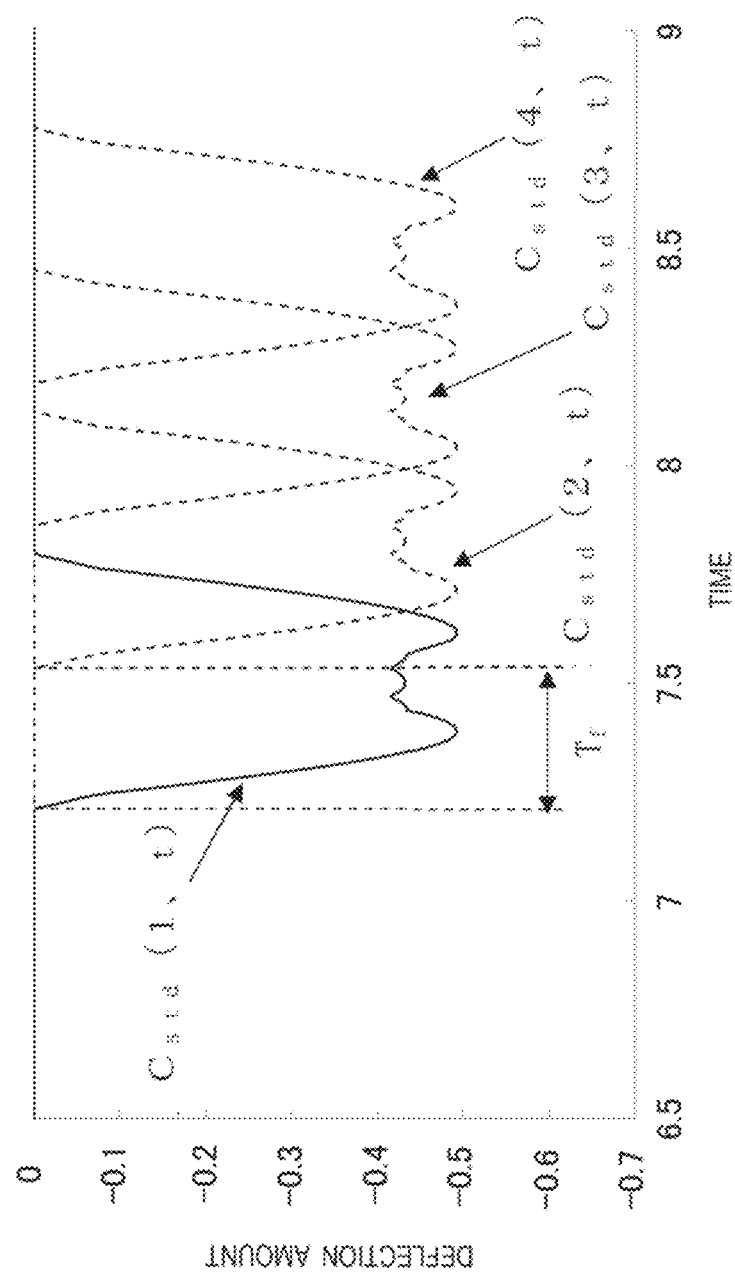
FIG. 10 is a diagram showing deflection of the unit bridge girder caused by each railway vehicle.

The deflection amounts $C_{std}(1, t)$ to $C_{std}(4, t)$ by four railway vehicles included in the railway train at this time are shown in FIG. 10. A cycle of vibration generated in the bridge when the railway vehicles continuously pass through the bridge is defined as $T_f$. The vibration generated in the bridge when the railway vehicles continuously pass through the bridge is vibration generated when the continuous railway vehicles pass through the bridge. For this reason, the cycle $T_f$ is a time difference between the entry time points of the continuous railway vehicles passing through the bridge into the bridge. Since the bridge is deflected by the railway vehicle from the time point when the railway vehicle enters the bridge, the time difference between a start time point of the deflection indicated by $C_{std}(m, t)$ and a start time point of the deflection indicated by $C_{std}(m+1, t)$ is the cycle $T_f$. FIG. 10 shows the deflection generated in the bridge due to the passage of each railway vehicle of the railway train when the railway train passes through the bridge. In a graph of FIG. 10, a horizontal axis represents time, and a vertical axis represents the deflection amount. As shown in FIG. 10, the deflection due to the passing of the railway vehicles in front and rear occurs at a time difference of $T_f$.

Since the cycle $T_f$ is a time difference between the entry time points of the continuous railway vehicles passing through the bridge into the bridge, as shown in the following Equation (33), the cycle $T_f$ can be regarded as a period during which the railway vehicle having a vehicle length $L_c(m)$ passes through at a velocity $v_a$.

$$T_f = \frac{L_C(m)}{v_a} \quad (33)$$

A period during which the railway vehicle $C_m$ of the railway train passes through the bridge is defined as $t_c(m)$. $t_c(m)$ is an example of a moving object passing period, which is a period during which the railway vehicle $C_m$ which is a moving object passes through a bridge which is a structure. $t_c(m)$ is a period from the time point when the first axle of the railway vehicle $C_m$ reaches the entry end to the time point when the $a_r(m)$th axle of the railway vehicle $C_m$ reaches the exit end. That is, $t_c(m)$ is a period during which the railway vehicle $C_m$ moves by a total distance of the bridge length $L_B$ and the distance from the first axle which is the foremost axle of the railway vehicle $C_m$ to the $a_r(m)$th axle which is the rearmost axle of the railway vehicle $C_m$. Therefore, $t_c(m)$ is represented by the following Equation (34).

$$t_c(m) = \left\{ L_B + \sum_{n=1}^{a_r(m)} L_a(a_w(m, n)) - L_a(a_w(m, 1)) \right\} / v_a \quad (34)$$

When the railway train passes through the bridge, the number of railway vehicles for which the subsequent railway vehicle is present among the railway vehicles formed in the railway train is defined as $C_{Tn}$. Among the railway vehicles formed in the railway train, for the railway vehicles other than the rearmost railway vehicle, there is a subsequent railway vehicle. Therefore, $C_{Tn}$ is a number smaller than N by 1. That is, the following Equation (35) is established.

$$t_s = C_{Tn} T_f + t_c(m) \quad (35)$$

Figure 11:
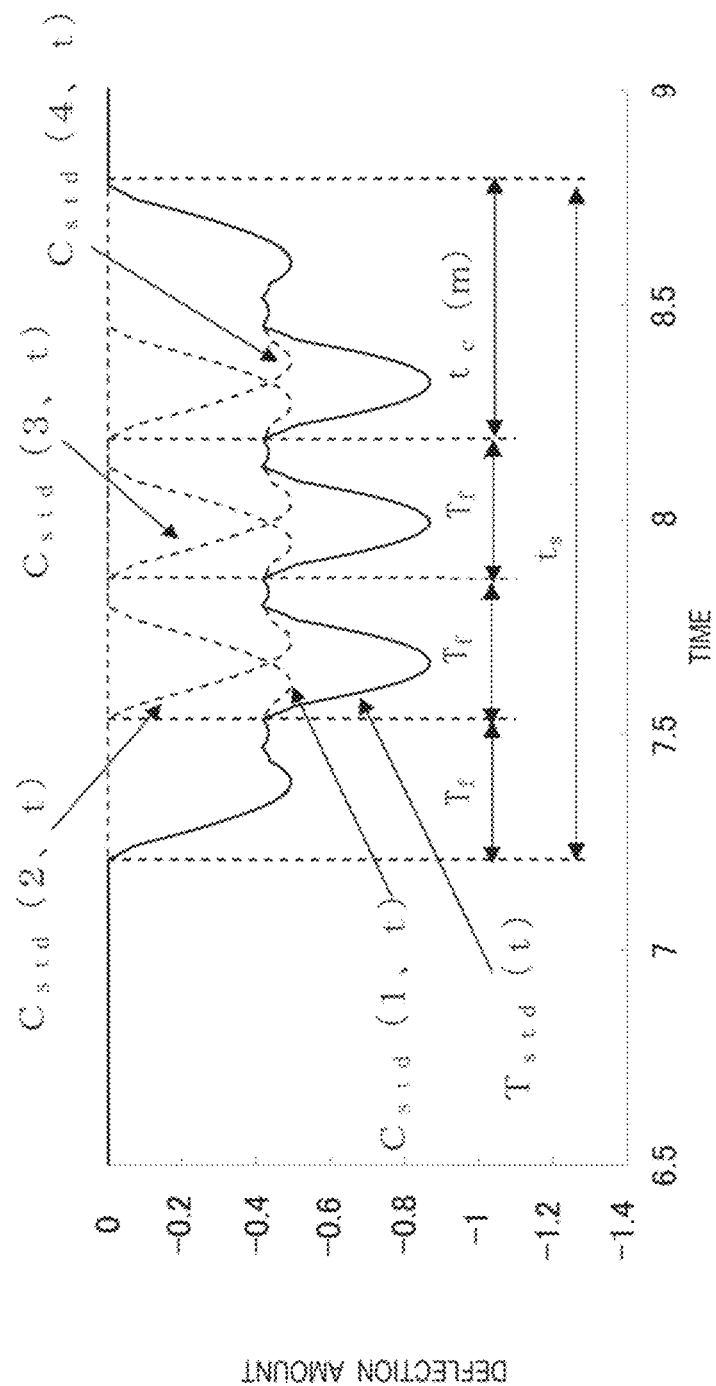
FIG. 11 is a diagram showing deflection of the unit bridge girder caused by each railway vehicle and the railway train.

FIG. 11 shows $C_{std}(1, t)$ to $C_{std}(N, t)$ and $T_{std}(t)$. In a graph of FIG. 11, a horizontal axis represents time, and a vertical axis represents the deflection amount. A solid line in the graph of FIG. 11 indicates $T_{std}(t)$, and dotted lines in the graph indicate $C_{std}(1, t)$ to $C_{std}(4, t)$. As shown in FIG. 11, the passing period $t_s$ is the sum of $C_{Tn} T_f$s and a period $t_c(m)$ during which one railway vehicle $C_m$ passes through the bridge. That is, the following Equation (36) is established.

$$N = C_{Tn} + 1 \quad (36)$$

From Equation (35) and Equation (36), the number N of railway vehicles formed in the railway train is represented by the following Equation (37).

$$N = \frac{t_s - t_c(m)}{T_f} + 1 \quad (37)$$

$T_f$ is also a period required for the railway train to move by the vehicle length of one railway vehicle. Therefore, the distance by which the railway train travels during the passing period $t_s$ is the sum of the length of the (N−1) railway vehicles and the distance by which the railway train travels during the period $t_c(m)$ at the velocity $v_a$. Therefore, the following Equation (38) is established.

$$v_a = \frac{(N-1)L_C(m) + t_c(m)v_a}{t_s} \quad (38)$$

From Equation (38), the following Equation (39) is established. From Equation (39), it can be confirmed that Equation (37) is established.

$$(N-1) = \frac{v_a t_s - t_c(m)v_a}{L_C(m)} = \frac{t_s - t_c(m)}{\frac{L_C(m)}{v_a}} = \frac{t_s - t_c(m)}{T_f} \quad (39)$$

It is considered that the deflection amount $T_{std}(t)$ generated in the bridge when the railway train passes through the bridge includes, as a component of the fundamental frequency, a component of vibration generated in the bridge in accordance with the movement of the continuous railway vehicles. Here, the fundamental frequency is a frequency of a component having the lowest frequency included in the signal. This fundamental frequency is defined as $F_f$. $F_f$ is also the frequency of the vibration generated in the bridge in accordance with the movement of the continuous railway vehicles, and thus can be represented as a reciprocal of $t_f$ as shown in the following Equation (40).

$$F_f = \frac{1}{T_f} \quad (40)$$

From Equation (33) and Equation (40), the velocity $v_a$ is represented by the product of $F_f$ and $L_c(m)$ as in the following Equation (41).

$$v_a = F_f L_c(m) \quad (41)$$

Therefore, $t_c(m)$ represented by Equation (34) is a value obtained by dividing the total distance of the bridge length $L_B$ and the distance from the first axle which is the foremost axle of the railway vehicle $C_m$ to the $a_r(m)$th axle which is the rearmost axle by the product of $F_f$ and $L_c(m)$.

From Equation (37) and Equation (40), the number N of railway vehicles formed in the railway train is represented as a value obtained by adding one to the product of the fundamental frequency $F_f$ and a value obtained by subtracting the passing period $t_c(m)$ of one railway vehicle $C_m$ passing through the bridge from the passing period $t_s$ of the railway train passing through the bridge, and is represented by the following Equation (42).

$$N = (t_s - t_c(m))F_f + 1 \quad (42)$$

The inventors found that the average velocity $v_a$ of the railway train is represented by the product of the fundamental frequency $F_f$ and the length of one railway vehicle $C_m$ included in the railway train, as represented by Equation (41). In addition, the inventors found that the period $t_c(m)$ during which one railway vehicle $C_m$ passes through the bridge is represented as a period during which the railway vehicle $C_m$ moves a length of the sum of the length $L_B$ of the bridge and the distance from the first axle of the railway vehicle $C_m$ to the $a_r(m)$th axle at the velocity $v_a$, as represented by Equation (34). Further, the inventors found that the number N of railway vehicles formed in the railway train is represented as a value obtained by adding one to the product of the fundamental frequency $F_f$ and a value obtained by subtracting $t_c(m)$ from $t_s$, as represented by Equation (42).

Then, the inventors conceived a method of deriving the number of railway vehicles formed in the railway train by using time-series data of a displacement at an observation point set on a bridge on which the railway train moves.

The method conceived by the inventors is as follows.

The time-series data of the displacement at the observation point set on the bridge on which the railway train moves is acquired. Hereinafter, the time-series data of the displacement at the observation point set on the bridge is defined as u(t). u(t) is data of discrete values of the displacement measured in a predetermined cycle, and is data in which each discrete value is associated with a measurement time point. In addition, the lengths $L_B$, $L_c$, and $L_a$ are acquired as the environmental information. Then, based on the time-series data u(t), the fundamental frequency $F_f$ of u(t) is acquired as the frequency of the vibration generated in the bridge due to the passage of the continuous railway vehicles formed in the railway train. Based on u(t), the period $t_s$ during which the railway train passes through the bridge is derived. Then, based on the lengths $L_B$, $L_c$ and $L_a$, the fundamental frequency $F_f$, and the passing period $t_s$, the number of railway vehicles included in the railway train is derived using the relationships represented by Equation (34), Equation (41), and Equation (42).

The inventors conducted an experiment for confirming the effectiveness of the conceived method. This experiment will be described below.

The inventors acquired time-series data of the displacement at the observation point by measuring the displacement of the bridge at the observation point set on the bridge in a predetermined cycle $\Delta T$ when the railway train formed with 16 railway vehicles passes through a predetermined bridge. This predetermined bridge is referred to as a first bridge. In the first bridge, with the passage of the railway train, resonance with vibration generated in the first bridge due to the passage of the railway train formed with the continuous railway vehicles did not occur. Here, the resonance means that the vibration generated in the bridge due to the passage of the railway train and a natural frequency of the bridge approximate each other, and thus the natural frequency or harmonic vibration of the natural frequency is excited in the bridge due to the vibration generated in the bridge due to the passage of the railway train. Hereinafter, the vibration generated by resonance is referred to as a dynamic response.

The environmental information at this time is known and is as follows. $L_B$=25 [m], $L_x$=12.5 [m], $L_c$=25 [m], $a_r$=4, $L_a(a_w(m, 1))$=2.5 [m] for each of m=1 to N, $L_a(a_w(m, 2))$=2.5 [m] for each of m=1 to N, $L_a(a_w(m, 3))$=15 [m] for each of m=1 to N, and $L_a(a_w(m, 4))$=2.5 [m] for each of m=1 to N.

The observation information is not known except for N. That is, it is assumed that $t_i$, $t_o$, and $t_s$ are not known in advance. The number N of railway vehicles formed in the railway train is 16.

Figure 12:
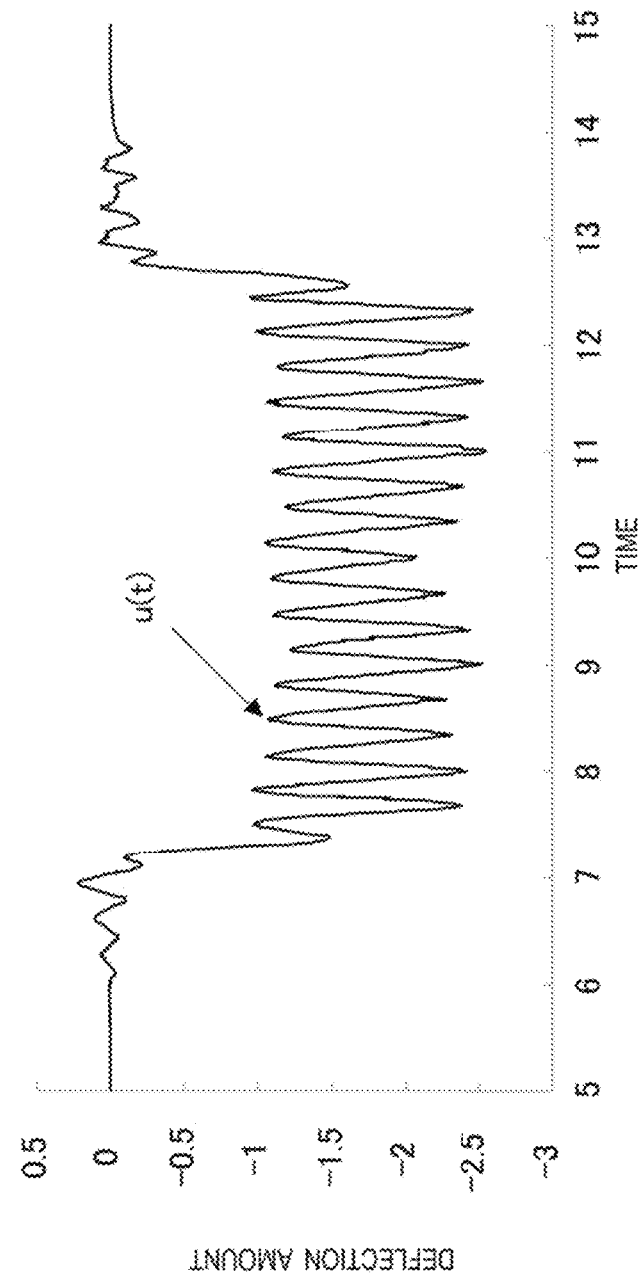
FIG. 12 is a diagram showing time-series data of displacement of the unit bridge girder.

FIG. 12 shows time-series data u(t) of the displacement of the observation point in the first bridge acquired by the inventors. In a graph of FIG. 12, a horizontal axis represents time, and a vertical axis represents the deflection amount.

Figure 13:
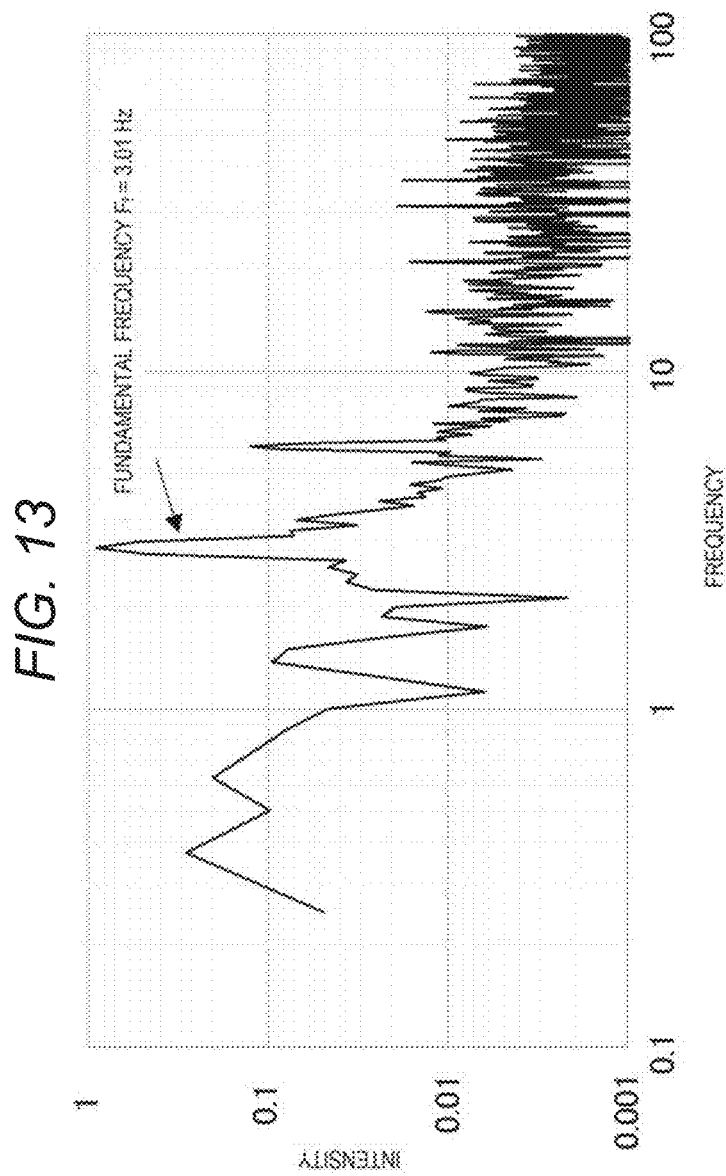
FIG. 13 is a diagram showing an FFT result of the time-series data.

The inventors performed fast Fourier transform (FFT) on u(t). A result of the FFT of u(t) is shown in FIG. 13. In a graph of FIG. 13, a horizontal axis represents the frequency, and a vertical axis represents the intensity of the corresponding frequency component. Then, the inventors derived the fundamental frequency $F_f$ of u(t) from the result of the FFT of u(t) as the frequency of the vibration generated in the first bridge in accordance with the movement of the continuous railway vehicles. Specifically, the inventors specified a peak corresponding to the lowest frequency from the result of the FFT of u(t) except for a side lobe generated due to an influence of a window function used in the FFT, and obtained the specified peak as the fundamental frequency. In an example of FIG. 13, the inventors obtained a value of 3.01 Hz as the fundamental frequency $F_f$ from the graph of FIG. 13.

The inventors also obtained the cycle $T_f$ of the vibration generated in the first bridge due to the passage of the railway train by obtaining a reciprocal of the obtained fundamental frequency $F_f$. The inventors performed low-pass filter processing for attenuating a component of a frequency equal to or higher than the fundamental frequency on u(t) by performing a moving average on u(t) in the cycle $T_f$. u(t) subjected to the low-pass filter processing is defined as $u_{lp}(t)=u_{lp}(k\Delta T)$. Here, k is a variable indicating what number of observations when the deflection amount is observed in a cycle at the observation point. That is, when a data cycle (time resolution) of the observation of the deflection amount is $\Delta T$, $t=k\Delta T$. Hereinafter, the low-pass filter processing will be described in detail.

As shown in the following Equation (43), a moving average interval $k_{mf}$ adjusted to the time resolution of the data is obtained from the cycles $T_f$ and $\Delta T$.

$$k_{mf} = 2\left\lfloor \frac{T_f}{2\Delta T} \right\rfloor + 1 \qquad (43)$$

By using $k_{mf}$, $u_{lp}(t)$ is obtained by the following Equation (44).

$$u_{lp}(t) = u_{lp}(k\Delta T) = \frac{1}{k_{mf}} \sum_{n=k-\frac{k_{mf}-1}{2}}^{k+\frac{k_{mf}-1}{2}} u(n\Delta T) \qquad (44)$$

The inventors obtained $k_{mf}$ from the cycles $T_f$ and $\Delta T$ using Equation (43), and obtained $u_{lp}(t)$ from the obtained $k_{mf}$ and u(t) using Equation (44). The above is the details of the low-pass filter processing. The low-pass filter processing may be processing of applying an FIR filter under a condition of attenuating a component of a frequency equal to or higher than the fundamental frequency $F_f$.

Then, the inventors specified, from ulp(t), two consecutive pieces of data between which a predetermined threshold $C_L$ related to the deflection amount is. Here, the fact that the threshold $C_L$ is between the two consecutive pieces of data of $u_{lp}(t)$ means that the threshold CL is included in a range between the values of the two pieces of consecutively measured data of the displacement included in $u_{lp}(t)$, that is, a range from the smaller value of these pieces of data of the displacement to the larger value of these pieces of data of the displacement. The threshold $C_L$ is a value of deflection generated in the bridge in accordance with the entry of the railway train into the bridge, and is, for example, a value of deflection at the observation point of the bridge when the railway vehicle is disposed such that the wheel of the first axle at the head railway vehicle is placed in the vicinity of the entry end. The threshold $C_L$ may be another value as long as the threshold $C_L$ can used for detecting the entry of the railway train into the bridge, and may be, for example, a deflection amount of the observation point of the bridge when a predetermined weight is applied to the vicinity of the entry end. The threshold $C_L$ may be a value of a predetermined ratio (for example, 10%, 1%, or the like) of the maximum value of the deflection amount at the observation point of the bridge when the railway train passes through the bridge. The threshold $C_L$ may be set to a value of any data included in $u_{lp}(t)$.

Figure 14:
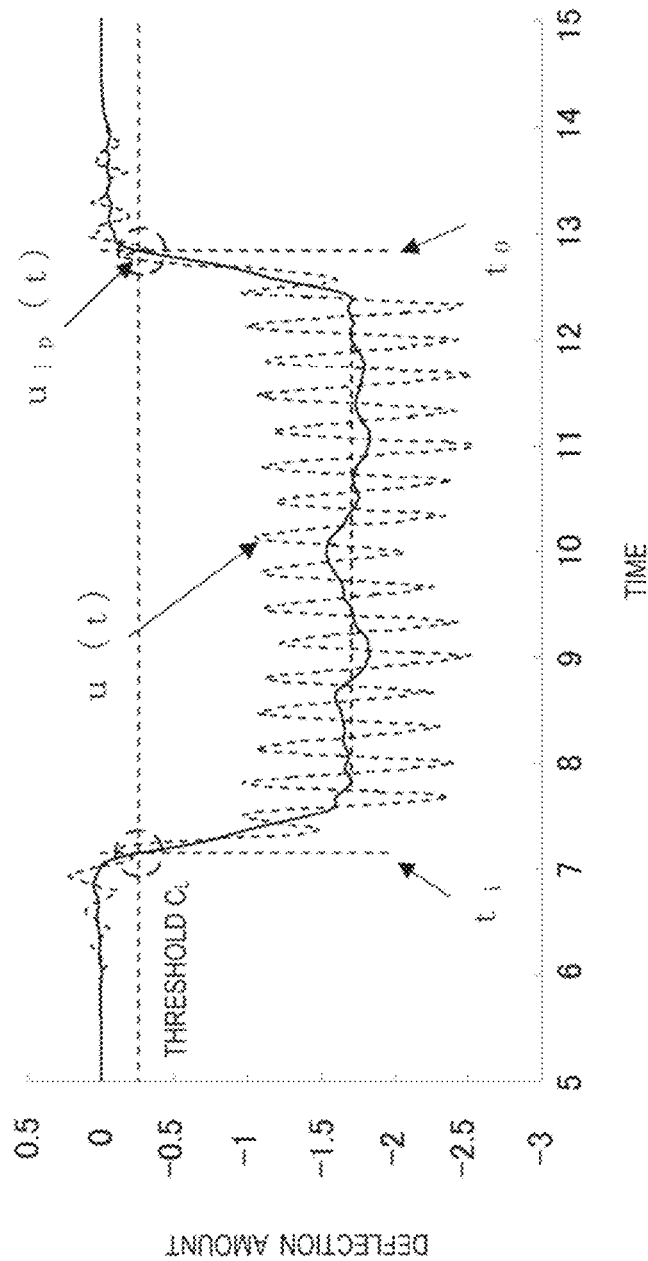
FIG. 14 is a diagram showing derivation processing of an entry time point and an exit time point.
Figure 15:
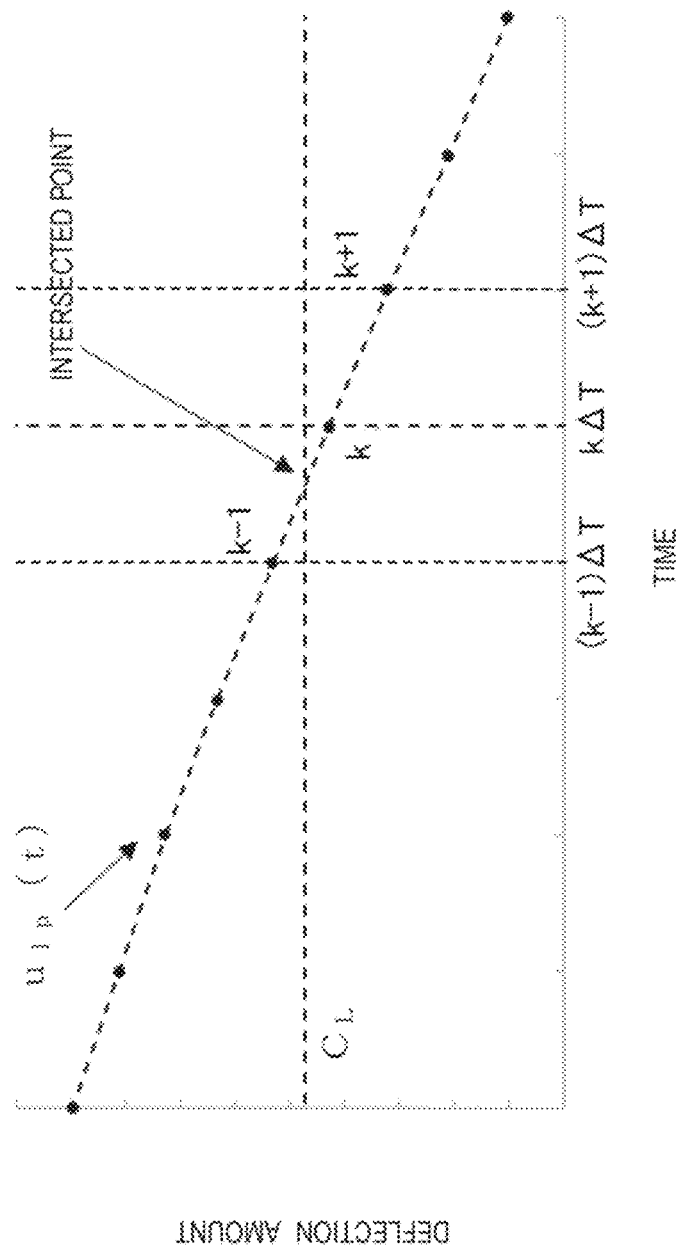
FIG. 15 is a diagram showing the derivation processing of the entry time point and the exit time point.

FIG. 14 shows $u_{lp}(t)$ and the threshold $C_L$. In a graph of FIG. 14, a horizontal axis represents time ($t=k\Delta T$), and a vertical axis represents the deflection amount. A solid line in the graph of FIG. 14 indicates $u_{lp}(t)$, and a dotted line in the graph indicates u(t). In portions surrounded by dotted circles in FIG. 14, $u_{lp}(t)$ and the threshold $C_L$ intersect with each other. FIG. 15 shows an enlarged view of a portion where $u_{lp}(t)$ and $C_L$ intersect with each other (a portion of a dotted circle on the left side in the graph of FIG. 14). In a graph of FIG. 15, a horizontal axis represents time, and a vertical axis represents the deflection amount. Black dots in FIG. 15 indicate data of discrete values included in $u_{lp}(t)$. In an example of FIG. 15, the threshold $C_L$ is between data k−1 included in $u_{lp}(t)$ and data k.

The inventors specified a later one of two time points corresponding to the two consecutive pieces of data between which the specified $C_L$ is. In the example of FIG. 15, a time point kΔT corresponding to the data k is specified.

In an example of FIG. 14, the inventors specified two pieces of data in a portion of a dotted circle on the right side in FIG. 14 as two consecutive pieces of data between which $C_L$ is, and specified the later one of two time points corresponding to the specified two pieces of data.

Then, the inventors derived the earlier one of the specified time points as the entry time point $t_i$ of the railway train entering into the bridge. The inventors also derived the later one of the specified time points as the exit time point $t_o$ of the railway train exiting from the bridge. In the example of FIG. 14, the inventors derived that the entry time point $t_i$=7.2 [s] and the exit time point $t_o$=12.795 [s]. Then, the inventors derived $t_s$ as $t_o−t_i$=12.795−7.2=5.595 [sec].

The inventors derived, using Equation (41), the average velocity $v_a$ of the railway train as 25 [m]×3.01 [Hz]=75.25 [m/sec] based on $L_c(m)$=25 [m] and the obtained $F_f$=3.01 [Hz]. The inventors also derived, using Equation (34), the period $t_c(m)$ during which one railway vehicle $C_m$ passes through the first bridge as (25+2.5+2.5+15+2.5−2.5)/75.25=0.5980 [seconds] based on $L_B$, $L_a$, and the derived $v_a$. In addition, the inventors derived, using Equation (42), the number N of railway vehicles formed in the railway train as (5.595−0.5980)×3.01+1=16.04097 based on the derived $F_f$, $t_s$, and $t_c(m)$. This estimated value is approximated to 16, which is the number N of railway vehicles. Therefore, the inventors confirmed that the number of railway vehicles included in the railway train can be derived with high accuracy by using the conceived method.

In addition, the inventors conducted an experiment of deriving the number of railway vehicles formed in the railway train by using the conceived method when a similar railway train passes through a second bridge different from the first bridge. In the second bridge, with the passage of the railway train, resonance with vibration generated in the bridge due to the passage of the railway train formed with the continuous railway vehicles occurred.

The environmental information at this time is known and is as follows. $L_B$=25 [m], $L_x$=12.5 [m], $L_c$=25 [m], $a_r$=4, $L_a(a_w(m, 1))$=2.5 [m] for each of m=1 to N, $L_a(a_w(m, 2))$=2.5 [m] for each of m=1 to N, $L_a(a_w(m, 3))$=15 [m] for each of m=1 to N, and $L_a(a_w(m, 4))$=2.5 [m] for each of m=1 to N.

The observation information is not known except for N. That is, it is assumed that $t_i$, $t_o$, and $t_s$ are not known in advance. The number N of railway vehicles formed in the railway vehicle is 16.

Figure 16:
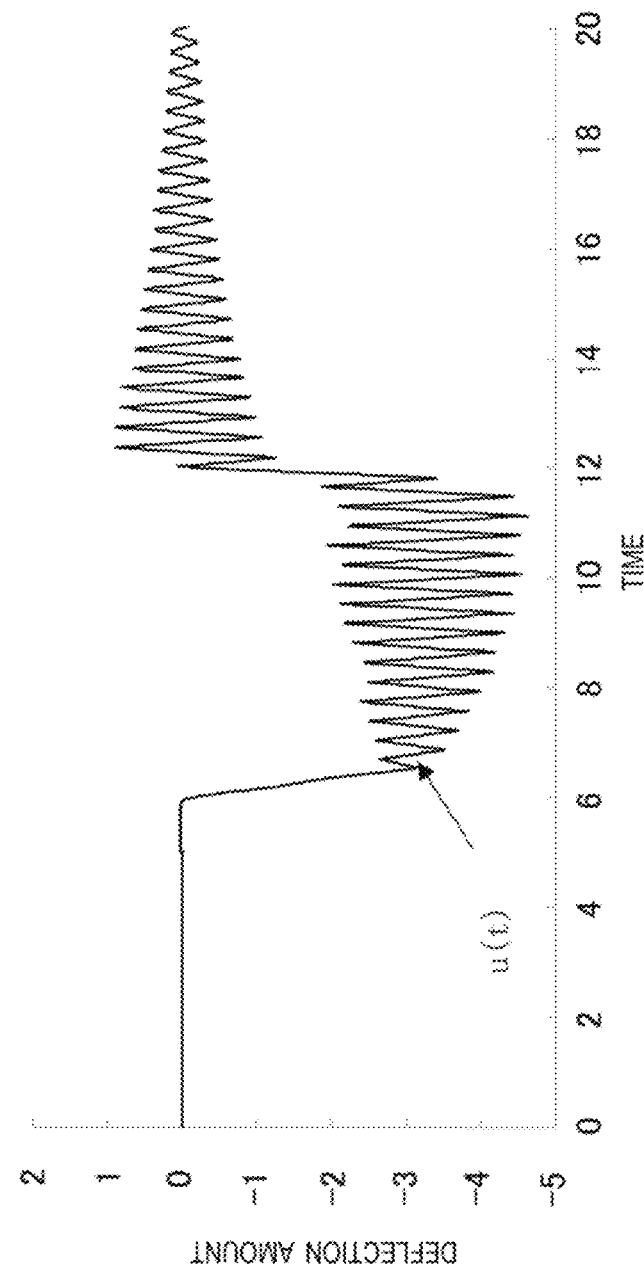
FIG. 16 is a diagram showing the time-series data of the displacement of the unit bridge girder.

The inventors acquired time-series data of the displacement at the observation point by measuring the displacement of the bridge at the observation point set on the second bridge in a predetermined cycle ΔT when the railway train passes through the second bridge. The time-series data of the displacement of the observation point in the second bridge acquired by the inventors is defined as u(t). FIG. 16 shows this u(t). In a graph of FIG. 16, a horizontal axis represents time, and a vertical axis represents the deflection amount. The graph of FIG. 16 shows a dynamic response generated in the bridge as compared with the graph of FIG. 12.

Figure 17:
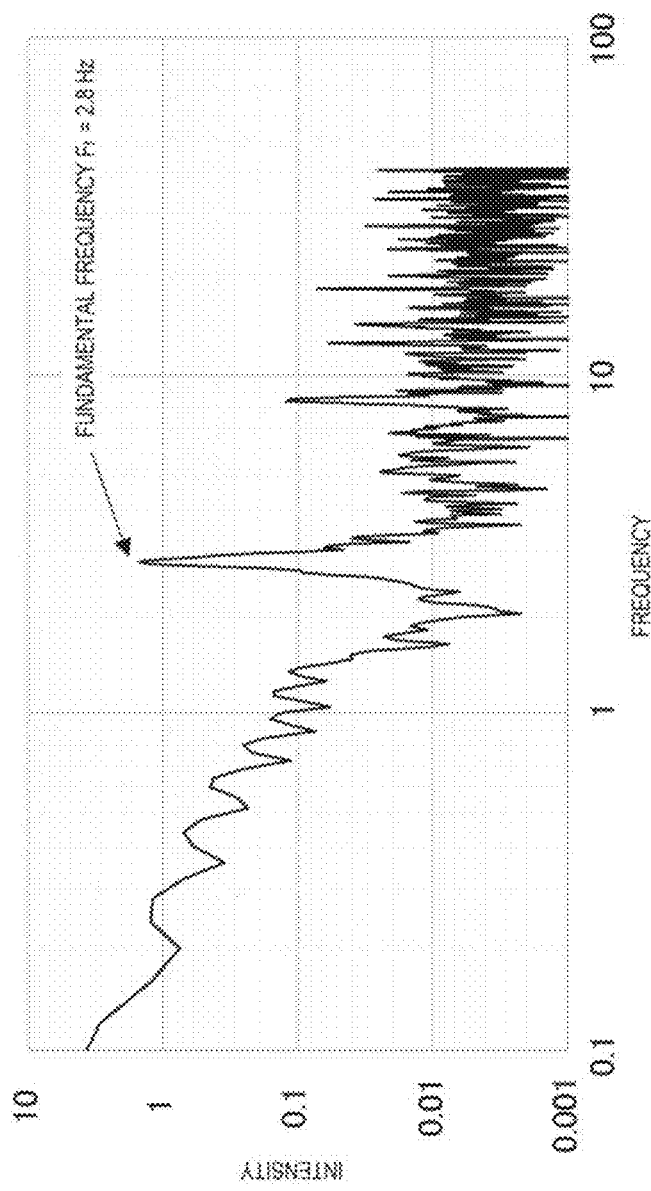
FIG. 17 is a diagram showing the FFT result of the time-series data.

The inventors performed the FFT on u(t). The result of the FFT of u(t) is shown in FIG. 17. In a graph of FIG. 17, a horizontal axis represents the frequency, and a vertical axis represents the intensity of the corresponding frequency component. The dynamic response is generated by resonance with vibration generated in the second bridge due to the passage of the railway train. Therefore, the component of the dynamic response is a component having substantially the same frequency as the frequency of the vibration generated in the second bridge due to the passage of the railway train, and a component having a frequency that is an integral multiple of the frequency. Therefore, the inventors found that even when u(t) includes an influence of the dynamic response, the fundamental frequency of u(t) indicates the frequency of the vibration generated in the second bridge due to the passage of the railway train.

Therefore, the inventors derived the fundamental frequency $F_f$ of u(t) from the result of the FFT of u(t) as the frequency of the vibration generated in the second bridge in accordance with the movement of the continuous railway vehicles. In an example of FIG. 17, the inventors obtained a value of 2.8 Hz as the fundamental frequency $F_f$ from the graph of FIG. 17.

Figure 18:
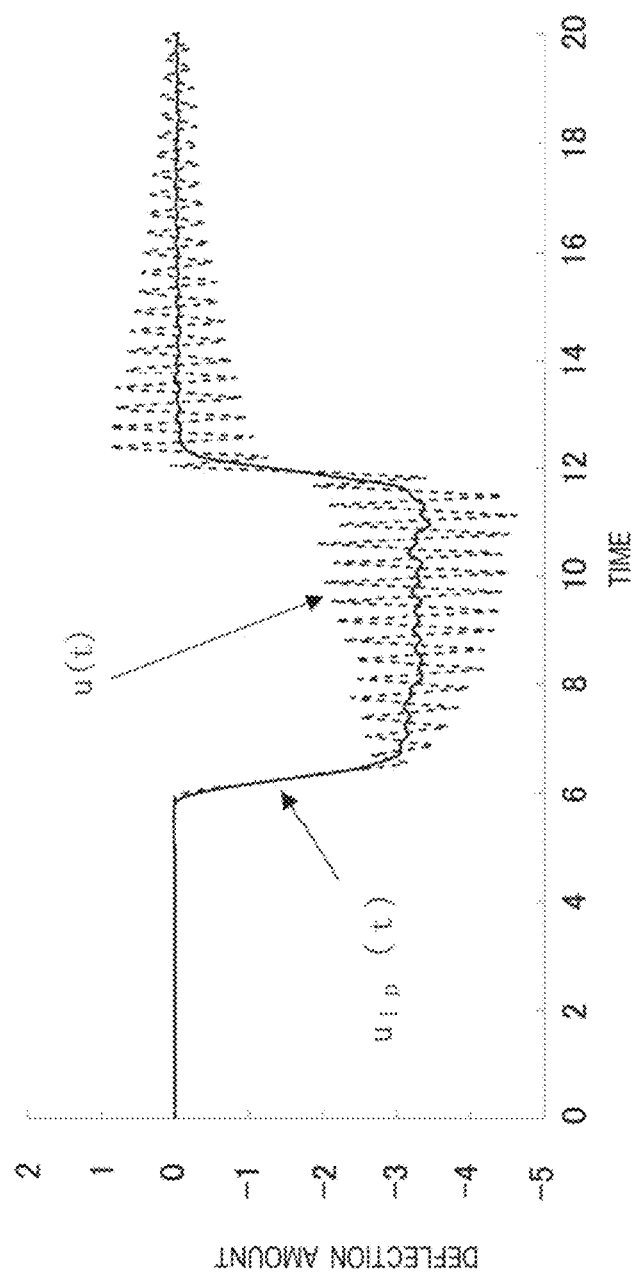
FIG. 18 is a diagram showing time-series data subjected to low-pass filter processing.

The inventors also obtained the cycle $T_f$ of the vibration generated in the second bridge due to the passage of the railway train by obtaining the reciprocal of the obtained fundamental frequency $F_f$. The inventors performed the low-pass filter processing for attenuating a component of a frequency equal to or higher than the fundamental frequency on u(t) by performing a moving average on u(t), and determined $u_{lp}(t)$. Specifically, the inventors obtained $k_{mf}$ from the cycles $T_f$ and ΔT using Equation (43), and obtained $u_{lp}(t)$ from the obtained $k_{mf}$ and u(t) using Equation (44). Therefore, the influence of the dynamic response on u(t) is reduced. FIG. 18 shows $u_{lp}(t)$ superimposed on u(t). In a graph of FIG. 18, a horizontal axis represents time, and a vertical axis represents the deflection amount. A solid line in the graph of FIG. 18 indicates $u_{lp}(t)$, and a dotted line in the graph indicates u(t). FIG. 18 shows a state in which the influence of the dynamic response is reduced.

Then, the inventors specified, from $u_{lp}(t)$, two sets of two consecutive pieces of data between which the predetermined threshold $C_L$ related to the deflection amount is. For each of the two specified sets, the inventors specified a later one of two time points corresponding to the two consecutive pieces of data between which the specified $C_L$ is. The inventors derived the earlier one of the specified time points as the entry time point $t_i$, and derived the later one as the exit time point $t_o$. The inventors derived $t_i$ as 5.984 [sec] and $t_o$ as 12.284 [sec]. The inventors derived $t_s$ as $t_o−t_i$=12.284−5.984=6.3 [seconds]. Since the influence of the dynamic response is reduced by using $u_{lp}(t)$ subjected to the low-pass filter processing, the entry time point $t_i$ and the exit time point $t_o$ can be derived more accurately.

The inventors derived, using Equation (41), the average velocity $v_a$ of the railway train as 25 [m]×2.8 [Hz]=70 [m/sec] based on $L_c(m)$=25 [m] and the obtained $F_f$=2.8 [Hz]. The inventors also derived, using Equation (34), the period $t_c(m)$ during which one railway vehicle $C_m$ passes through the bridge as (46.77+2.5+2.5+15+2.5−2.5)/70=0.954 [seconds] based on $L_B$=46.77 [m], $L_a$, and the derived $v_a$. In addition, the inventors derived, using Equation (42), the number N of railway vehicles formed in the railway train as (6.3−0.954)×2.8+1=15.9692 based on the derived $F_f$, $t_s$, and $t_c(m)$. This estimated value is approximated to 16, which is the number N of railway vehicles. Therefore, the inventors confirmed that the number of railway vehicles included in the railway train can be derived with high accuracy by using the conceived method.

Based on the method conceived by the inventors, the derivation system 10 of the present embodiment derives the number of railway vehicles formed in the railway train 6 based on the time-series data of the displacement at the observation point in the unit bridge girder of the bridge 5.

(1-4) Details of Elements

Figure 19:
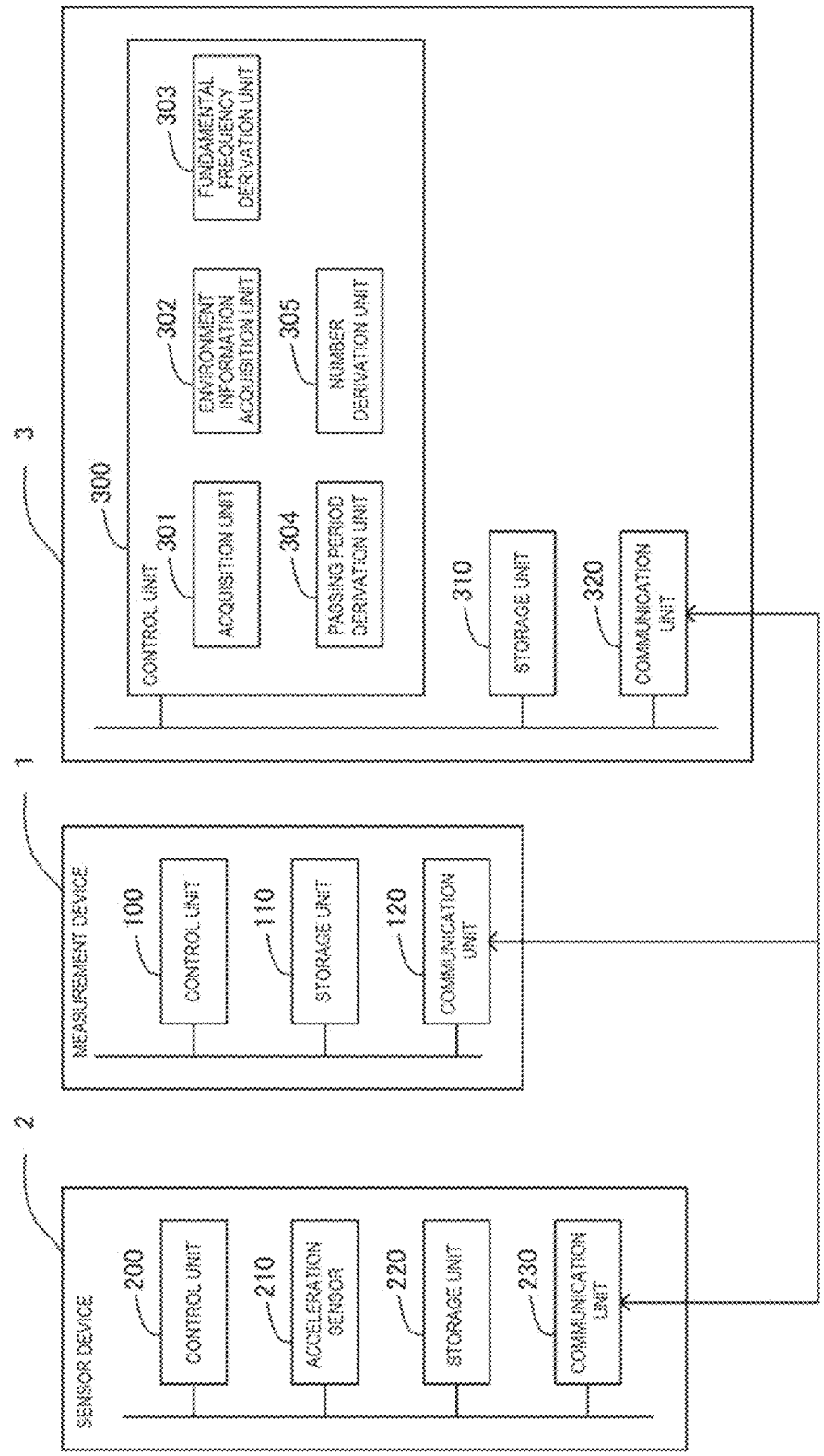
FIG. 19 is a diagram showing details of elements of the derivation system.

Here, each of the measurement device 1, the sensor device 2, and the server device 3 of the derivation system 10 will be described in detail with reference to FIG. 19.

In the present embodiment, the derivation system 10 derives the observation information (the number N of railway vehicles formed in the railway train 6, the time point $t_i$ at which the railway train 6 enters the unit bridge girder, the time point $t_o$ at which the railway train 6 exits the unit bridge girder, and the period $t_s$ during which the railway train 6 passes through the unit bridge girder) based on data measured by the measurement device 1.

The measurement device 1 measures the deflection at the observation point via the sensor device 2. In the present embodiment, the measurement device 1 is installed on the bridge abutment 8b, but may be installed at another position. The measurement device 1 includes a control unit 100, a storage unit 110, and a communication unit 120. The control unit 100 includes a processor such as a CPU (Central Processing Unit), a ROM (Read Only Memory), a RAM (Random Access Memory), and the like. The control unit 100 implements each function of the measurement device 1 by loading various programs recorded in the ROM or the like in the RAM and executing the programs via the CPU. The storage unit 110 stores various programs, measured deflection data, and the like. The communication unit 120 includes a circuit used for wired or wireless communication with an external device.

The sensor device 2 detects the acceleration as the predetermined physical quantity at the observation point. The sensor device 2 includes a control unit 200, an acceleration sensor 210, a storage unit 220, and a communication unit 230. The control unit 200 includes a processor such as a CPU, a ROM, a RAM, and the like. The control unit 200 implements each function of the sensor device 2 by loading various programs recorded in the ROM or the like in the RAM and executing the programs via the CPU.

The acceleration sensor 210 is an acceleration sensor such as a quartz acceleration sensor or a MEMS acceleration sensor capable of detecting an acceleration generated in each axial direction of three axes orthogonal to one another. In the present embodiment, the acceleration sensor 210 is disposed such that one axis is parallel to the vertical direction in order to more accurately detect the acceleration in the vertical direction. However, an installation location of the sensor device 2 in the superstructure 7 may be inclined. Even when one of the three detection axes of the acceleration sensor 210 is not installed in alignment with the vertical direction, the measurement device 1 combines the accelerations of the three axes and detects the acceleration in the vertical direction.

The control unit 200 of the sensor device 2 detects an acceleration in a cycle in the vertical direction at the observation point on the bridge 5 via the acceleration sensor 210, and transmits the detected acceleration data to the measurement device 1. The control unit 100 of the measurement device 1 measures the deflection of the bridge 5 in the vertical direction at the observation point at an acceleration detection time point based on the acceleration data transmitted from the sensor device 2. In the present embodiment, the control unit 100 obtains the deflection of the bridge 5 in the vertical direction at the observation point by integrating the acceleration indicated by the data transmitted from the sensor device 2 twice with respect to time. Then, the control unit 100 transmits the measured deflection data to the server device 3. In the present embodiment, the sensor device 2 detects the acceleration in a predetermined cycle $\Delta T$. Therefore, the measurement device 1 measures time-series data of the deflection in the $\Delta T$ cycle. That is, the measured time-series data is data of discrete values of displacement measured in the $\Delta T$ cycle, and is data in which each discrete value is associated with the measurement time point.

The server device 3 derives the number of railway vehicles included in the railway train 6 based on the deflection of the observation point measured by the measurement device 1. The server device 3 is an example of a derivation device. The server device 3 includes a control unit 300, a storage unit 310, and a communication unit 320. The control unit 300 includes a processor such as a CPU, a ROM, a RAM, and the like. The control unit 300 implements functions of an acquisition unit 301, an environment information acquisition unit 302, a fundamental frequency derivation unit 303, a passing period derivation unit 304, and a number derivation unit 305, by loading various programs recorded in the ROM or the like into the RAM and executing the programs via the CPU. The storage unit 310 stores various programs, the detected deflection data, and the like. The communication unit 320 includes a circuit used for wired or wireless communication with an external device.

The acquisition unit 301 has a function of acquiring the time-series data of the deflection generated at the observation point as a response caused by the movement of the railway train 6 on each bridge in the bridge 5. With the function of the acquisition unit 301, the control unit 300 acquires the time-series data u(t) of the deflection generated at the observation point from the measurement device 1.

The environment information acquisition unit 302 has a function of acquiring environment information including information on the bridge length of the unit bridge girder, the vehicle length of the railway vehicles formed in the railway train 6, and the position of the axle that is the installation position of the wheel in the railway vehicle. With the function of the environment information acquisition unit 302, the control unit 300 acquires information on the bridge length $L_B$ of the unit bridge girder, the vehicle length $L_c$ of each railway vehicle of the railway train 6, and the distance $L_a$ indicating the position of each railway vehicle of the railway train 6 as the environment information. In the present embodiment, the environment information is stored in advance in the storage unit 310, and the control unit 300 acquires the environment information from the storage unit 310. However, the control unit 300 may acquire the environment information by using another method such as receiving the environment information from an external device.

The fundamental frequency derivation unit 303 has a function of deriving the fundamental frequency $F_f$ of u(t), which indicates the frequency of the vibration generated in the unit bridge girder due to the passage of the railway train 6, based on the time-series data u(t). The control unit 300 executes the FFT on u(t) with the function of the fundamental frequency derivation unit 303. The control unit 300 detects peaks from the FFT result. The control unit 300 specifies, among the detected peaks, a peak corresponding to a minimum frequency obtained by excluding a peak of a side lobe generated due to an influence of a window function used in the FFT. The control unit 300 derives the frequency corresponding to the specified peak as the fundamental frequency $F_f$ of u(t).

The passing period derivation unit 304 has a function of deriving the passing period $t_s$ during which the railway train 6 passes through the unit bridge girder based on the time-series data u(t). With the function of the passing period derivation unit 304, the control unit 300 derives the reciprocal of the fundamental frequency $F_f$ acquired with the function of the fundamental frequency derivation unit 303, thereby deriving the cycle $T_f$ of the vibration generated in the unit bridge girder caused by the passage of the railway train 6. The control unit 300 derives the interval $k_{mf}$ using Equation (43) based on the derived $T_f$ and $\Delta T$ which is a predetermined cycle. The control unit 300 applies a low-pass filter to u(t) and obtains $u_{lp}(t)$ which is u(t) subjected to the low-pass filter processing by taking a moving average in the derived interval $k_{mf}$ for each value of u(t). Specifically, the control unit 300 derives $u_{lp}(t)$ using Equation (44) based on the derived interval $k_{mf}$.

Then, the control unit 300 specifies, from $u_{lp}(t)$, two consecutive pieces of data between which a predetermined threshold $C_L$ related to the deflection amount is. The control unit 300 specifies a later one of two time points corresponding to the two consecutive pieces of data between which the specified $C_L$ is.

The control unit 300 derives the earlier one of the specified time points as the entry time point $t_i$ of the railway train 6 entering into the unit bridge girder. In addition, the control unit 300 derives the later one of the specified time points as the exit time point $t_o$ of the railway train 6 exiting from the unit bridge girder.

As described above, in the present embodiment, the control unit 300 derives the later one of the two time points corresponding to the two consecutive pieces of data between which $C_L$ is, which are included in $u_{lp}(t)$, as the entry time point $t_i$ and the exit time point $t_o$. However, the control unit 300 may derive other time points as the entry time point $t_i$ and the exit time point $t_o$. For example, the control unit 300 may specify, from $u_{lp}(t)$, two consecutive pieces of data between which the predetermined threshold $C_L$ related to the deflection amount is, and derive, as the entry time point $t_i$ and the exit time point $t_o$, a time point that is during a period after one time point of the time points corresponding to the two specified pieces of data and before the other time point. In the example of FIG. 15, the control unit 300 may derive, as the entry time point $t_i$, a time point after a time point $(k-1)\Delta T$ corresponding to the data k−1 and before the time point $k\Delta T$ corresponding to the data k (for example, time point $(k-1)\Delta T$, a time point corresponding to a point where $u_{lp}(t)$ and $C_L$ intersect with each other, or the like). In addition, the control unit 300 may obtain a curve obtained by interpolating data included in $u_{lp}(t)$, and obtain time points corresponding to intersection points of the obtained curve and $C_L$ as $t_i$ and $t_o$.

It is conceivable that one of two consecutive pieces of data between which $C_L$ included in $u_{lp}(t)$ is present is equal to $C_L$. For example, in the example of FIG. 15, the value of the data k may be equal to $C_L$. In this case, the control unit 300 may select any one of two sets, that is, a set of data equal to $C_L$ and data preceding the data and a set of data equal to $C_L$ and data following the data, as two consecutive pieces of data between which $C_L$ is. In the example of FIG. 15, when the data k is equal to the $C_L$, the control unit 300 selects any one of the two sets of the set of the data k−1 and the data k and the set of the data k and the data k+1 as two consecutive pieces of data between which $C_L$ is. The control unit 300 may derive a time point in a period between two time points corresponding to two pieces of data included in the selected set as $t_i$ or $t_o$.

In the present embodiment, the control unit 300 derives the time point associated with any data included in $u_{lp}(t)$ as the entry time point $t_i$ and the exit time point $t_o$. As a result, the control unit 300 can easily acquire and utilize the data of $u_{lp}(t)$ corresponding to each measurement time point of $\Delta T$ interval including the entry time point $t_i$ and the exit time point $t_o$ by referring to $u_{lp}(t)$. On the other hand, when deriving the time point not associated with any data included in $u_{lp}(t)$ as the entry time point $t_i$ and the exit time point $t_o$, the control unit 300 obtains the data of $u_{lp}(t)$ corresponding to each measurement time point of the $\Delta T$ interval including $t_i$ and to by resampling from the original $u_{lp}(t)$ or the like, which increases time and effort of processing.

The control unit 300 derives the entry time point and the exit time point by using $u_{lp}(t)$ in which a vibration component of a frequency equal to or higher than the fundamental frequency is attenuated, thereby reducing an influence of the vibration component of a frequency equal to or higher than the fundamental frequency and more accurately deriving the entry time point and the exit time point.

However, the control unit 300 may not derive $u_{lp}(t)$. In this case, the control unit 300 may derive $t_i$ and to using u(t) instead of $u_{lp}(t)$, for example.

Then, the control unit 300 derives the passing period $t_s$ as $t_o - t_i$.

The number derivation unit 305 has a function of deriving the number of railway vehicles included in the railway train 6 based on the environmental information acquired with the function of the environmental information acquisition unit 302, the fundamental frequency $F_f$ derived with the function of the fundamental frequency derivation unit 303, and the passing period $t_s$ derived with the function of the passing period derivation unit 304.

With the function of the number derivation unit 305, the control unit 300 derives the average velocity $v_a$ of the railway train using Equation (41) based on the fundamental frequency $F_f$, and the vehicle length $L_c(m)$ of the railway vehicles of the railway train 6 indicated by the environmental information. In the present embodiment, since the railway train 6 is formed with the same railway vehicle, $L_c(m)$ has the same value for each of m=1 to N.

Based on the derived $v_a$ and $L_B$ and $L_a$ that are indicated by the environment information, the control unit 300 derives the period $t_c(m)$ during which one railway vehicle passes through the bridge using Equation (34). Then, based on the derived $F_f$, $t_s$, and $t_c(m)$, the control unit 300 derives the number N of railway vehicles formed in the railway train using Equation (42).

As described above, according to the configuration of the present embodiment, the derivation system 10 can derive the number of railway vehicles based on the time-series data of the deflection at the observation point and the environmental information. In addition, the derivation system 10 derives the fundamental frequency $F_f$ from the result of the FFT of u(t), derives the average velocity $v_a$ of the railway train using Equation (41) based on the vehicle length $L_c(m)$ and $F_f$, derives the period $t_c(m)$ during which one railway vehicle passes through the bridge using Equation (34) based on the derived $v_a$, $L_B$, and $L_a$, and derives the number N of railway vehicles formed in the railway train using Equation (42) based on the derived $F_f$, $t_s$ and $t_c(m)$. As described above, the derivation system 10 can obtain the number of railway vehicles formed in the railway train 6 with a smaller amount of calculation and a lower load than in the case of obtaining the number of railway vehicles formed in the railway train 6 with an inverse analysis method. Thus, the derivation system 10 can obtain the number of railway vehicles formed in the railway train 6 with a lower load.

In addition, since the number of railway vehicles is derived with higher accuracy by the derivation system 10, it is possible to diagnose the bridge with higher accuracy using the derived number. For example, based on the number N derived in the processing of the present embodiment, $T_{std}(t)$ represented by Equation (32) is derived using the deflection model. Since the number N is derived with higher accuracy, the deflection amount $T_{std}(t)$ is also derived with higher accuracy. In addition, by using the deflection amount $T_{std}(t)$ derived in this manner, it is possible to calculate an impact coefficient of impact on the bridge with high accuracy. By using such an impact coefficient, it is possible to diagnose the bridge with high accuracy. Therefore, in dynamic design including risk factors including the resonance phenomenon of the railroad bridge, accurate measurement and derivation of the number of vehicles are effective.

(2) Derivation Processing

Processing of deriving the number of railway vehicles of the railway train 6 executed by the server device 3 will be described with reference to FIG. 20. The server device 3 starts processing in FIG. 20 in response to the fact that the data of the displacement at the observation point is transmitted from the measurement device 1, but may start the processing in FIG. 20 at any timing such as a designated timing.

In S100, the control unit 300 acquires the time-series data u(t) of the deflection generated at the observation point from the measurement device 1 by the function of the acquisition unit 301. S100 is an example of an acquisition step.

In S105, with the function of the environment information acquisition unit 302, the control unit 300 acquires information on the bridge length $L_B$ of the unit bridge girder, the vehicle length $L_c$ of each railway vehicle of the railway train 6, and the distance $L_a$ indicating the position of each railway vehicle of the railway train 6 as the environment information. S105 is an example of an environment information acquisition step.

In S110, the control unit 300 executes the FFT on u(t) acquired in S100 with the function of the fundamental frequency derivation unit 303. The control unit 300 detects peaks from the FFT result. The control unit 300 specifies, among the detected peaks, a peak corresponding to a minimum frequency obtained by excluding a peak of a side lobe generated due to an influence of a window function used in the FFT. The control unit 300 derives the frequency corresponding to the specified peak as the fundamental frequency $F_f$ of u(t). S110 is an example of a fundamental frequency derivation step.

In S115, the control unit 300 derives the cycle $T_f$ by deriving the reciprocal of the fundamental frequency $F_f$ with the function of the passing period derivation unit 304. The control unit 300 derives $k_{mf}$ using Equation (43) based on the derived $T_f$ and $\Delta T$ which is a predetermined cycle. Then, the control unit 300 derives $u_{lp}(t)$ from the derived $k_{mf}$ and u(t) using Equation (44). The control unit 300 specifies an intersection point between the derived $u_{lp}(t)$ and the predetermined threshold $C_L$ related to the deflection amount, that is, two points at which $u_{lp}(t)=C_L$, derives the earlier one of the time points corresponding to the specified points as the entry time point $t_i$, and derives the later one as the exit time point $t_o$. Then, the control unit 300 derives the passing period $t_s$ as $t_o-t_i$. S115 is an example of a passing period derivation step.

In S120, the control unit 300 derives the average velocity $v_a$ of the railway train using Equation (41) based on the fundamental frequency $F_f$ and the vehicle length $L_c$ (m) of the railway vehicles of the railway train 6 indicated by the environmental information with the function of the number derivation unit 305. Based on the derived $v_a$ and $L_B$ and $L_a$ that are indicated by the environment information, the control unit 300 derives the period $t_c$(m) during which one railway vehicle passes through the bridge using Equation (34). Then, based on the derived $F_f$, $t_s$, and $t_c$(m), the control unit 300 derives the number N of railway vehicles formed in the railway train using Equation (42). S120 is an example of a number derivation step. Processing of deriving $t_c$(m) in S120 is an example of a moving object passing period derivation step.

(3) Other Embodiments

The above embodiments are examples for carrying out the present disclosure, and various other embodiments can be adopted. The method of deriving the number of railway vehicles of the railway train from the displacement at the observation point as in the above embodiment can also be implemented as an invention of a program and an invention of a method.

Further, a configuration in which the function of the server device 3 is implemented by a plurality of devices may be adopted. The functions of the server device 3 may be distributed and implemented in a plurality of devices. In addition, the functions of the server device 3 may be implemented in another device. For example, the functions of the acquisition unit 301, the environment information acquisition unit 302, the fundamental frequency derivation unit 303, the passing period derivation unit 304, and the number derivation unit 305 may be implemented in the measurement device 1. The server device 3 may be distributed in a plurality of devices, or the like. Further, the above embodiments are examples, and an embodiment in which a part of the configuration is omitted or another configuration is added may be adopted.

In the above embodiment, the derivation system 10 derives the number of railway vehicles included in the railway train 6 formed with one or more railway vehicles that are moving objects. However, the derivation system 10 may derive the number of moving objects included in another formation moving object. The derivation system 10 may derive the number of moving objects included in another formation moving object. For example, the derivation system 10 may derive the number of trucks included in a formation truck in which one or more trucks are coupled.

Further, in the above embodiment, the derivation system 10 derives the number of moving objects included in the formation moving object that moves on the bridge 5. However, the derivation system 10 may derive the number of moving objects included in the formation moving object that moves on a structure different from the bridge, such as a base that supports a railroad track.

In addition, in the above embodiment, the number of sensor devices 2 included in the derivation system 10 is two, but may be one or three or more.

In the above embodiment, the control unit 300 acquires, as the time-series data u(t), the data of displacement (deflection) measured from the acceleration detected via the acceleration sensor 210. However, the control unit 300 may acquire, as u(t), displacement data of the bridge derived from a physical quantity detected via a sensor such as an impact sensor, a pressure-sensitive sensor, a strain gauge, an image measuring device, a load cell, or a displacement gauge. For example, the control unit 300 may detect the displacement of the observation point and acquire the detected displacement data by the image measuring device capturing an image of a predetermined object in a cycle, the predetermined object being disposed at the observation point of the bridge 5. The control unit 300 may acquire data of a physical quantity different from the displacement of the bridge as u(t). For example, the control unit 300 may acquire, as u(t), the number of pixels indicating the displacement amount of the predetermined object disposed at the observation point of the bridge 5 in the image captured via the image measuring device.

Further, in the above embodiment, the control unit 300 specifies the peak corresponding to the lowest frequency, except for the side lobe generated due to the influence of the window function used in the FFT, from the result of the FFT on the time-series data u(t) acquired by the function of the acquisition unit 301, and obtains the specified peak as the fundamental frequency $F_f$. However, in consideration of an influence of a noise generated in the result of the FFT on u(t), the control unit 300 may obtain the fundamental frequency $F_f$. For example, the control unit 300 may specify a peak equal to or greater than a predetermined threshold corresponding to the lowest frequency, except for the side lobe generated due to the influence of the window function used in the FFT, from the result of the FFT on u(t), and obtain the specified peak as the fundamental frequency $F_f$.

The time-series data may be data acquired at a data rate of twice or more the frequency of vibration assumed to occur in the structure due to the movement of the formation moving object.

Further, the present disclosure can also be applied as a program executed by a computer or a method. In addition, the program and method as described above may be implemented as a single device or may be implemented by using components included in a plurality of devices, and includes various aspects. In addition, it is possible to appropriately change the configuration such that a part of the configuration is software and a part of the configuration is hardware. Further, the present disclosure is also applicable to a recording medium of a program. As a matter of course, the recording medium of the program may be a magnetic recording medium, a semiconductor memory, or the like, and any recording medium to be developed in the future can be considered in the same manner.

What is claimed is:

1. A derivation method for causing a processor to execute a program stored in a memory to perform a process, the derivation method comprising executing on the processor the steps of:

acquiring time-series acceleration data of acceleration generated at a predetermined observation point in a superstructure of a bridge as a response caused by a movement of a railway train including one or more cars on the superstructure, the acceleration being detected by an acceleration sensor disposed at the predetermined observation point;

acquiring a weight of the cars of the railway train based on the time-series acceleration data;

acquiring environment information relating to a structure length of the superstructure, a car length of one of the cars of the railway train, and installation positions of wheels of the railway train contacting the superstructure;

acquiring a deflection model of the superstructure of the bridge based on the time-series acceleration data and the environment information;

deriving a fundamental frequency of a vibration of the superstructure due to the movement of the railway train on the superstructure based on a result of fast Fourier transform of the time-series acceleration data;

deriving a passing period of time during which the railway train passes along the superstructure based on the time-series acceleration data and a predetermined threshold;

deriving a number of the cars included in the railway train based on the environment information, the fundamental frequency, and the passing period of time;

repeating the acquiring of the time-series acceleration data, the acquiring of the weight, the acquiring of the environment information, the acquiring of the deflection model, the deriving of the fundamental frequency, the deriving of the passing of time, and the deriving the number of the cars to obtain a total number of the cars of the railway trains that move on the superstructure during a predetermined period of time and a total weight of the weight of the cars of the railway trains that move on the superstructure during the predetermined period of time; and diagnosing a state of the superstructure of the bridge based on the derived total number of the cars included in the railway trains, the total weight of the railway trains, and the deflection model in consideration of a risk factor including a resonance phenomenon existing due to vibration of the superstructure caused by the acceleration.

2. The derivation method according to claim 1, wherein the deriving of the passing period of time is configured with:

performing low-pass filter processing for the time-series data to obtain filtered time-series data, a vibration component of a frequency equal to or higher than the fundamental frequency of the time-series data being attenuated;

acquiring a period of time that is after one of two time points and before the other of the two time points, the two time points corresponding to two consecutive pieces of data of the filtered time-series data, the predetermined threshold existing within the two consecutive pieces of data; and determining the one of the two time points, the other of the two time points, and the acquired period of time as corresponding to an entry time point at which the railway train enters the superstructure, an exit time point at which the railway train exits the superstructure, and the passing period of time, respectively.

3. The derivation method according to claim 1, further comprising:

deriving another passing period of time during which one of the cars of the railway train passes the superstructure, wherein the acceleration corresponds to a displacement of the superstructure, and the deriving of the number of the cars is configured with:

subtracting the another passing period of time from the passing period of time to obtain a subtracted value;

adding one to a product of the subtracted value and the fundamental frequency to obtain an added value; and determining the added value as corresponding to the number of the cars.

4. The derivation method according to claim 3, wherein
the wheels are installed to the railway train via axles including a foremost axle and a rearmost axle, and
the deriving of the passing period of time is configured with:
  adding the structure length and a distance between the foremost axle and the rearmost axle of one of the cars to obtain a sum value;
  dividing the sum value by a product of the fundamental frequency and the car length to obtain a divided value; and
  determining the divided value as corresponding to the another passing period of time.

5. The derivation method according to claim 1, wherein a frequency corresponding to a peak having a lowest corresponding frequency among peaks indicated by the result of the fast Fourier transform of the time-series data is derived as the fundamental frequency.

6. The derivation method according to claim 1, wherein the deflection model of the superstructure of the bridge is an equation based on an architecture of the superstructure of the bridge.

7. The derivation method according to claim 1, wherein the superstructure of the bridge has a simple beam shape with both ends supported.

8. The derivation method according to claim 1, wherein Bridge Weigh in Motion (BWIM) is applicable to the superstructure of the bridge.

9. A derivation device, comprising:
a memory configured to store a program; and
a processor configured to execute the program so as to:
  acquire time-series acceleration data of acceleration generated at a predetermined observation point in a superstructure of a bridge as a response caused by a movement of a railway train including one or more cars on the superstructure, the acceleration being detected by an acceleration sensor disposed at the predetermined observation point;
  acquire a weight of the cars of the railway train based on the time-series acceleration data;
  acquire environment information relating to a structure length of the superstructure, a car length of one of the cars of the railway train, and installation positions of wheels of the railway train contacting the superstructure;
  acquire a deflection model of the superstructure of the bridge based on the time-series acceleration data and the environment information;
  derive a fundamental frequency of a vibration of the superstructure due to the movement of the railway train on the superstructure based on a result of fast Fourier transform of the time-series acceleration data;
  derive a passing period of time during which the railway train passes along the superstructure based on the time-series acceleration data and a predetermined threshold;
  derive a number of the cars included in the railway train based on the environment information, the fundamental frequency, and the passing period of time;
  repeat the acquiring of the time-series acceleration data, the acquiring of the weight, the acquiring of the environment information, the acquiring of the deflection model, the deriving of the fundamental frequency, the deriving of the passing of time, and the deriving the number of the cars to obtain a total number of the cars of the railway trains that move on the superstructure during a predetermined period of time and a total weight of the weight of the cars of the railway trains that move on the superstructure during the predetermined period of time; and
  diagnose a state of the superstructure of the bridge based on the derived total number of the cars included in the railway trains, the total weight of the railway trains, and the deflection model in consideration of a risk factor including a resonance phenomenon existing due to vibration of the superstructure caused by the acceleration.

10. A derivation system comprising:
an acceleration sensor disposed at a predetermined observation point of a superstructure of a bridge; and
a derivation device including:
  a memory configured to store a program; and
  a processor configured to execute the program so as to:
    acquire time-series acceleration data of acceleration generated at the predetermined observation point in the superstructure of the bridge as a response caused by a movement of a railway train including one or more cars on the superstructure, the acceleration being detected by the acceleration sensor;
    acquire a weight of the cars of the railway train based on the time-series acceleration data;
    acquire environment information relating to a structure length of the superstructure, a car length of one of the cars of the railway train, and installation positions of wheels of the railway train contacting the superstructure;
    acquire a deflection model of the superstructure of the bridge based on the time-series acceleration data and the environment information;
    derive a fundamental frequency of a vibration of the superstructure due to the movement of the railway train on the superstructure based on a result of fast Fourier transform of the time-series acceleration data;
    derive a passing period of time during which the railway train passes along the superstructure based on the time-series acceleration data and a predetermined threshold;
    derive a number of the cars included in the railway train based on the environment information, the fundamental frequency, and the passing period of time;
    repeat the acquiring of the time-series acceleration data, the acquiring of the weight, the acquiring of the environment information, the acquiring of the deflection model, the deriving of the fundamental frequency, the deriving of the passing of time, and the deriving the number of the cars to obtain a total number of the cars of the railway trains that move on the superstructure during a predetermined period of time and a total weight of the weight of the cars of the railway trains that move on the superstructure during the predetermined period of time; and
    diagnose a state of the superstructure of the bridge based on the derived total number of the cars included in the railway trains, the total weight of the railway trains, and the deflection model in consideration of a risk factor including a resonance phenomenon existing due to vibration of the superstructure caused by the acceleration.

11. A non-transitory computer-readable storage medium storing a program for causing a computer to execute a process by a processor so as to perform the steps of:

acquiring time-series acceleration data of acceleration generated at a predetermined observation point in a superstructure of a bridge as a response caused by a movement of a railway train including one or more cars on the superstructure, the acceleration being detected by an acceleration sensor disposed at the predetermined observation point;

acquiring a weight of the cars of the railway train based on the time-series acceleration data;

acquiring environment information relating to a structure length of the superstructure, a car length of one of the cars of the railway train, and installation positions of wheels of the railway train contacting the superstructure;

acquiring a deflection model of the superstructure of the bridge based on the time-series acceleration data and the environment information;

deriving a fundamental frequency of a vibration of the superstructure due to the movement of the railway train on the superstructure based on a result of fast Fourier transform of the time-series acceleration data;

deriving a passing period of time during which the railway train passes along the superstructure based on the time-series acceleration data and a predetermined threshold;

deriving a number of the cars included in the railway train based on the environment information, the fundamental frequency, and the passing period of time;

repeating the acquiring of the time-series acceleration data, the acquiring of the weight, the acquiring of the environment information, the acquiring of the deflection model, the deriving of the fundamental frequency, the deriving of the passing of time, and the deriving the number of the cars to obtain a total number of the cars of the railway trains that move on the superstructure during a predetermined period of time and a total weight of the weight of the cars of the railway trains that move on the superstructure during the predetermined period of time; and diagnosing a state of the superstructure of the bridge based on the derived total number of the cars included in the railway trains, the total weight of the railway trains, and the deflection model in consideration of a risk factor including a resonance phenomenon existing due to vibration of the superstructure caused by the acceleration.

\* \* \* \* \*